US011800573B2

(12) United States Patent
Horn et al.

(10) Patent No.: US 11,800,573 B2
(45) Date of Patent: Oct. 24, 2023

(54) DISAGGREGATED UE

(71) Applicant: QUALCOMM Incorporated, San Diego, CA (US)

(72) Inventors: Gavin Bernard Horn, La Jolla, CA (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 4 days.

(21) Appl. No.: 17/227,040

(22) Filed: Apr. 9, 2021

(65) Prior Publication Data

US 2022/0330352 A1    Oct. 13, 2022

(51) Int. Cl.
*H04W 76/10* (2018.01)
*H04W 4/40* (2018.01)
(Continued)

(52) U.S. Cl.
CPC ............ *H04W 76/10* (2018.02); *H04W 4/40* (2018.02); *H04W 8/005* (2013.01); *H04W 12/08* (2013.01); *H04W 76/27* (2018.02); *H04W 84/12* (2013.01)

(58) Field of Classification Search
CPC ....... H04W 76/10; H04W 76/72; H04W 4/40; H04W 8/005; H04W 12/08; H04W 84/12;
(Continued)

(56) References Cited

U.S. PATENT DOCUMENTS 11,219,054 B2    1/2022 Gulati et al.
2015/0085848 A1    3/2015 Reunamaki et al.
(Continued)

FOREIGN PATENT DOCUMENTS

CN    104812076 A    7/2015
EP    2833694 A2    2/2015
(Continued)

OTHER PUBLICATIONS

"3rd Generation Partnership Project, Technical Specification Group Services and System Aspects, Study on Security Aspects of Enhancement for Proximity Based Services in the 5G System (5GS) (Release 17)", 3GPP Standard, Technical Report, 3GPP TR 33.847, 3GPP, vol. SA WG3 No. V0.5.0, Mar. 17, 2021 (Mar. 17, 2021), pp. 1-120, XP052000063, Retrieved from the Internet: URL: https://ftp.3gpp.org/Specs/archive/33_series/33.847/33847-050.zip33847-050.doox [Retrieved on Mar. 17, 2021] Section 6.32.2, p. 111-p. 114 Figures 6.32.2-1.

(Continued)

*Primary Examiner* — Farid Seyedvosoghi
(74) *Attorney, Agent, or Firm* — Procopio, Cory, Hargreaves & Savitch LLP / QUALCOMM Incorporated

(57) ABSTRACT

Apparatus, methods, and computer program products for a wireless device are provided. An example method includes establishing a first connection with a second wireless device. The example method further includes establishing a second connection with the network entity via the second wireless device based on a second credential. The example method further includes transmitting a first credential to the second wireless device, the first credential associated with relay of wireless traffic between the first wireless device and a network entity.

77 Claims, 22 Drawing Sheets

(51) Int. Cl.
*H04W 76/27* (2018.01)
*H04W 8/00* (2009.01)
*H04W 12/08* (2021.01)
*H04W 84/12* (2009.01)

(58) Field of Classification Search
CPC ... H04W 12/069; H04W 76/27; H04W 88/04; H04L 63/0281; H04L 63/0884
See application file for complete search history.

(56) References Cited

U.S. PATENT DOCUMENTS

| | | | |
|---|---|---|---|
| 2017/0325270 A1* | 11/2017 | Tenny | H04W 76/14 |
| 2018/0041898 A1* | 2/2018 | Hampel | H04L 63/10 |
| 2018/0287689 A1 | 10/2018 | Lee et al. | |
| 2018/0288822 A1 | 10/2018 | Lee et al. | |
| 2019/0104403 A1 | 4/2019 | Sharma et al. | |
| 2019/0363780 A1 | 11/2019 | Kahtava et al. | |
| 2020/0008062 A1* | 1/2020 | Tian | H04W 12/69 |
| 2020/0008127 A1 | 1/2020 | Ohtsuji | |
| 2020/0196321 A1 | 6/2020 | Zhang et al. | |
| 2020/0344708 A1* | 10/2020 | Liao | H04W 40/22 |
| 2021/0336688 A1* | 10/2021 | Lee | H04W 48/16 |

FOREIGN PATENT DOCUMENTS

| | | |
|---|---|---|
| EP | 3609259 A1 | 2/2020 |
| NO | 2018031343 A1 | 2/2018 |
| WO | WO-2018031343 A1 * | 2/2018 |
| WO | 2018202798 A1 | 11/2018 |
| WO | 2018204131 A1 | 11/2018 |
| WO | 2019121497 A1 | 6/2019 |
| WO | 2022042439 A1 | 3/2022 |
| WO | 2022213361 A1 | 10/2022 |
| WO | 2022213363 A1 | 10/2022 |

OTHER PUBLICATIONS

International Search Report and Written Opinion—PCT/US2022/019475—ISA/EPO—dated Jun. 3, 2022.

* cited by examiner

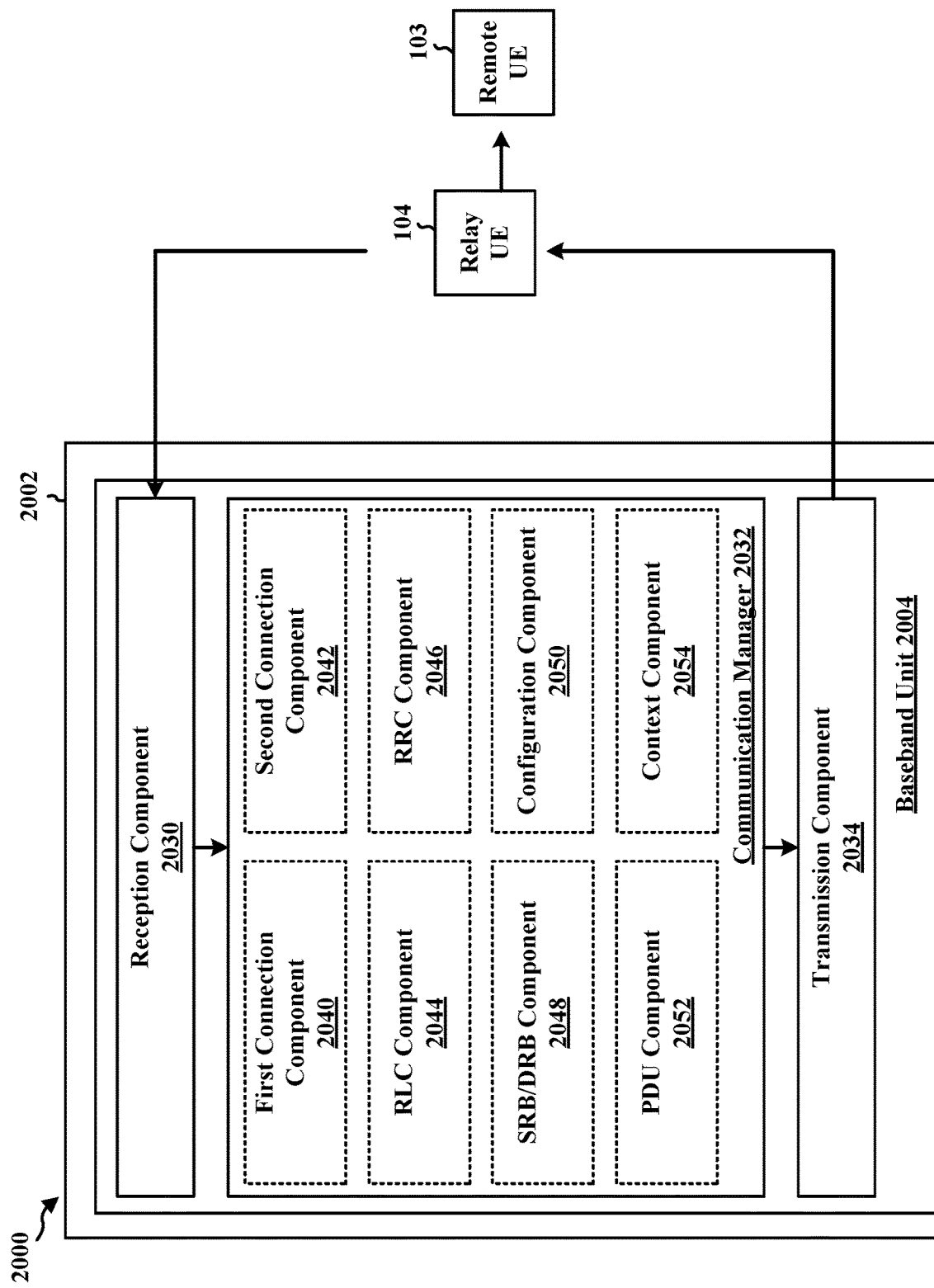

DISAGGREGATED UE

INTRODUCTION

The present disclosure relates generally to communication systems, and more particularly, to wireless communication including relayed communication to a network entity.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method is provided at a first wireless device. The method may include establishing a first connection with a second wireless device. The method may further include transmitting a first credential to the second wireless device, the first credential associated with relay of wireless traffic between the first wireless device and a network entity. The method may further include establishing a second connection with the network entity via the second wireless device based on a second credential.

In another aspect of the disclosure, an apparatus is provided at a first wireless device. The apparatus may include a memory and at least one processor coupled to the memory and configured to establish a first connection with a second wireless device. The memory and the at least one processor coupled to the memory may be further configured to transmit a first credential to the second wireless device, the first credential associated with relay of wireless traffic between the first wireless device and a network entity. The memory and the at least one processor coupled to the memory may be further configured to establish a second connection with the network entity via the second wireless device based on a second credential.

In another aspect of the disclosure, an apparatus is provided at a first wireless device. The apparatus may include means for establishing a first connection with a second wireless device. The apparatus may include means for transmitting a first credential to the second wireless device, the first credential associated with relay of wireless traffic between the first wireless device and a network entity. The apparatus may include means for establishing a second connection with the network entity via the second wireless device based on a second credential.

In another aspect of the disclosure, a computer-readable storage medium is provided at a first wireless device. The computer-readable storage medium may be configured to establish a first connection with a second wireless device. The computer-readable storage medium may be further configured to transmit a first credential to the second wireless device, the first credential associated with relay of wireless traffic between the first wireless device and a network entity. The computer-readable storage medium may be further configured to establish a second connection with the network entity via the second wireless device based on a second credential.

In another aspect of the disclosure, a method is provided at a second wireless device. The method may include establishing a first connection with the first wireless device. The method may further include receiving a credential from the first wireless device, the credential associated with the relay of the wireless traffic between the first wireless device and a network entity. The method may further include establishing a second connection with the network entity for the relay of wireless traffic between the first wireless device and a network entity, the second connection being established based on the credential received from the first wireless device.

In another aspect of the disclosure, an apparatus is provided at a second wireless device. The apparatus may include a memory and at least one processor coupled to the memory and configured to establish a first connection with the first wireless device. The memory and the at least one processor coupled to the memory may be further configured to receive a credential from the first wireless device, the credential associated with the relay of the wireless traffic between the first wireless device and a network entity. The memory and the at least one processor coupled to the memory may be further configured to establish a second connection with the network entity for the relay of wireless traffic between the first wireless device and a network entity, the second connection being established based on the credential received from the first wireless device.

In another aspect of the disclosure, an apparatus is provided at a second wireless device. The apparatus may include means for establishing a first connection with the first wireless device. The apparatus may include means for receiving a credential from the first wireless device, the credential associated with the relay of the wireless traffic between the first wireless device and a network entity. The apparatus may include means for establishing a second connection with the network entity for the relay of wireless traffic between the first wireless device and a network entity, the second connection being established based on the credential received from the first wireless device.

In another aspect of the disclosure, a computer-readable storage medium is provided at a second wireless device. The computer-readable storage medium may be configured to establish a first connection with a second wireless device. The computer-readable storage medium may be further configured to receive a credential from the first wireless device, the credential associated with the relay of the wireless traffic between the first wireless device and a network entity. The computer-readable storage medium may be further configured to establish a second connection with the network entity for the relay of wireless traffic between the first wireless device and a network entity, the second connection being established based on the credential received from the first wireless device.

In another aspect of the disclosure, a method is provided at a network entity. The method may include establishing, based on a first credential for a first wireless device, a first connection with a second wireless device for relaying of wireless traffic between the first wireless device and the network entity. The method may further include establishing a second connection with the first wireless device via the second wireless device based on a second credential.

In another aspect of the disclosure, an apparatus is provided at a network entity. The apparatus may include a memory and at least one processor coupled to the memory and configured to establish, based on a first credential for a first wireless device, a first connection with a second wireless device for relaying of wireless traffic between the first wireless device and the network entity. The memory and the at least one processor coupled to the memory may be further configured to establish a second connection with the first wireless device via the second wireless device based on a second credential.

In another aspect of the disclosure, an apparatus is provided at a network entity. The apparatus may include means for establishing, based on a first credential for a first wireless device, a first connection with a second wireless device for relaying of wireless traffic between the first wireless device and the network entity. The apparatus may include means for establishing a second connection with the first wireless device via the second wireless device based on a second credential.

In another aspect of the disclosure, a computer-readable storage medium is provided at a network entity. The computer-readable storage medium may be configured to establish, based on a first credential for a first wireless device, a first connection with a second wireless device for relaying of wireless traffic between the first wireless device and the network entity. The computer-readable storage medium may be further configured to establish a second connection with the first wireless device via the second wireless device based on a second credential.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 20 is a diagram illustrating an example of a hardware implementation for an example apparatus.

DETAILED DESCRIPTION

Figure 1:
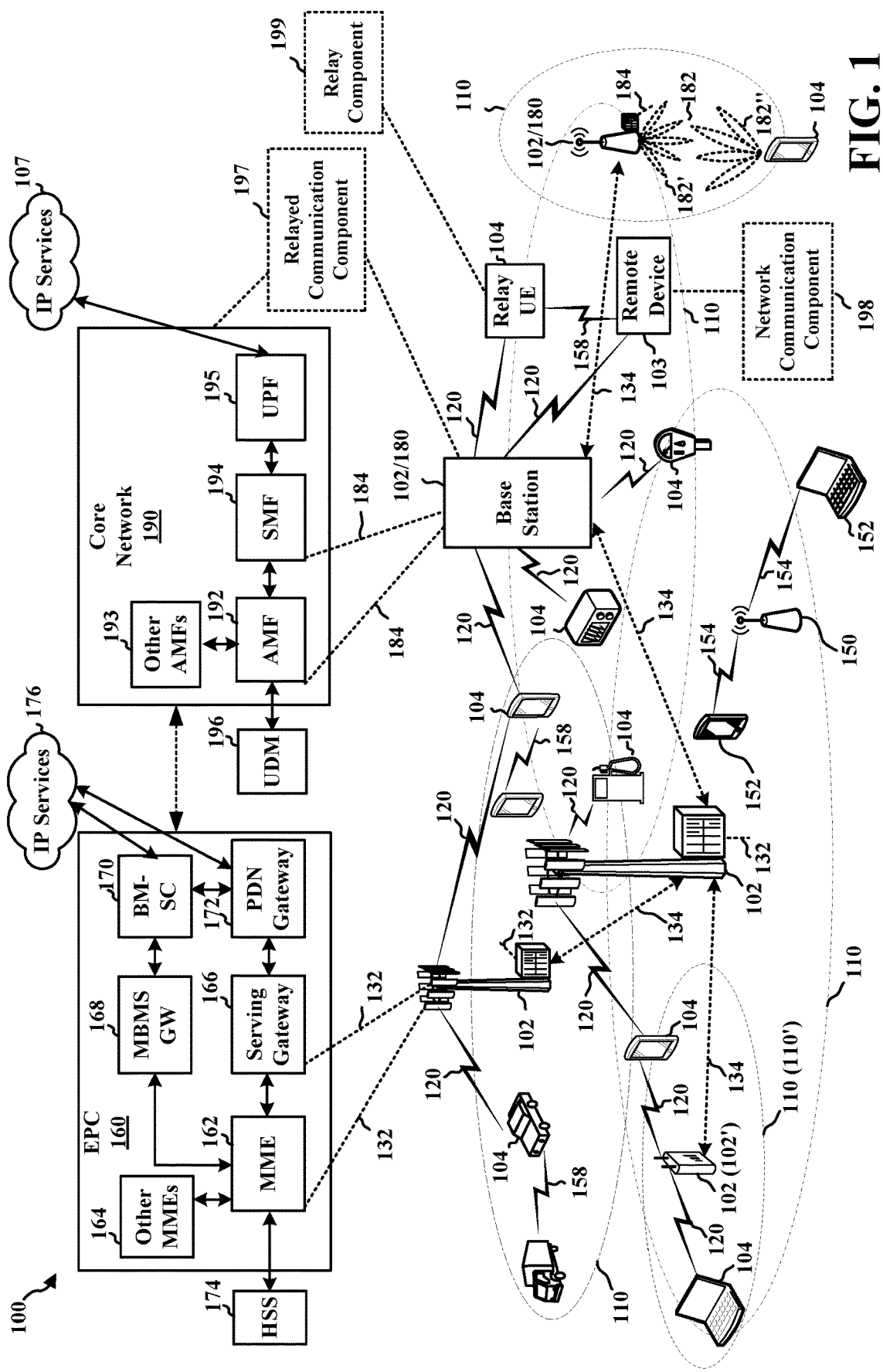
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

A wireless device such as a UE may support communication with a network entity over a connection based on a first radio access technology (RAT) (e.g., a Uu interface) and may support communication with another wireless device over a connection based on a different RAT (e.g., a PC5 interface, a Bluetooth low energy (BLE) interface, a WiFi-D interface, a WiFi interface, or a bluetooth (BL) regular interface, etc.). In some circumstances, the wireless device may not be able to reach the network entity using the Uu interface or may determine that the Uu interface is not suitable for current traffic criteria.

Aspects presented herein enable the wireless device to establish a local connection with the second wireless device (e.g., based on the PC5 interface, the BLE interface, the WiFi-D interface, WiFi interface, the BL interface, etc.) to relay communication between the first wireless device and the network entity. The wireless devices may be referred as relay UE and remote UE. As one non-limiting example, a UE may connect to a wireless network via another UE associated with a vehicle. The connection to the network via a vehicle UE may allow a non-vehicle UE to benefit from better RF performance through an antenna placed on an exterior of the vehicle and not subject to the shielding of the vehicle body. In some aspects, the relay wireless device may not have a subscription with the remote UE's home network and may not have credentials to access the remote UE's home network.

Aspects provided herein enable the relay UE to share one or more credentials of the remote UE for relaying wireless traffic between the remote UE and the home network. For example, a first credential may be shared by the remote UE with the relay UE to establish a relay connection with a network. A second credential may be used by the remote UE to establish a connection with the network via the relay. As one non-limiting example, the remote UE and the relay UE may be considered to be a disaggregated UE, i.e., collectively considered to be one control plane entity to a core network. A disaggregated UE may refer to a set of UEs that are collectively considered to be one control plane entity to a core network.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5GNR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 107. The IP Services 107 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a first wireless device (e.g., remote device 103), may include a network communication component 198 that is configured to establish a first connection to a second wireless device (e.g., UE 104), transmitting a first credential to the second wireless device, the first credential associated with relay of wireless traffic between the first wireless device and a network entity (e.g., base station 102 or 180), and establish a second connection with the network entity via the second wireless device based on a second credential. The first wireless device may be another UE in some examples.

A UE 104 (which may be referred to herein as a relay UE), or another type of wireless device, may include a relay component 199 configured to establishing the first connection with the first wireless device (e.g., remote device 103), receive a credential from the first wireless device, the credential associated with the relay of the wireless traffic between the first wireless device and a network entity, and establish a second connection with the network entity for the relay of wireless traffic between the first wireless device and a network entity, the second connection being established based on the credential received from the first wireless device.

A network entity, such as a base station 102 or 180 or other network entity, may include a relayed communication component 197 configured to establish, based on a first credential for a first wireless device (e.g., remote device 103), a first connection with a second wireless device (e.g., UE 104) for relaying of wireless traffic between the first wireless device and the network entity and establish a second connection with the first wireless device via the second wireless device based on a second credential.

Although the following description may be focused on 5G NR, the concepts described herein may be applicable to other similar areas, such as LTE, LTE-A, CDMA, GSM, and other wireless technologies.

Figure 2:
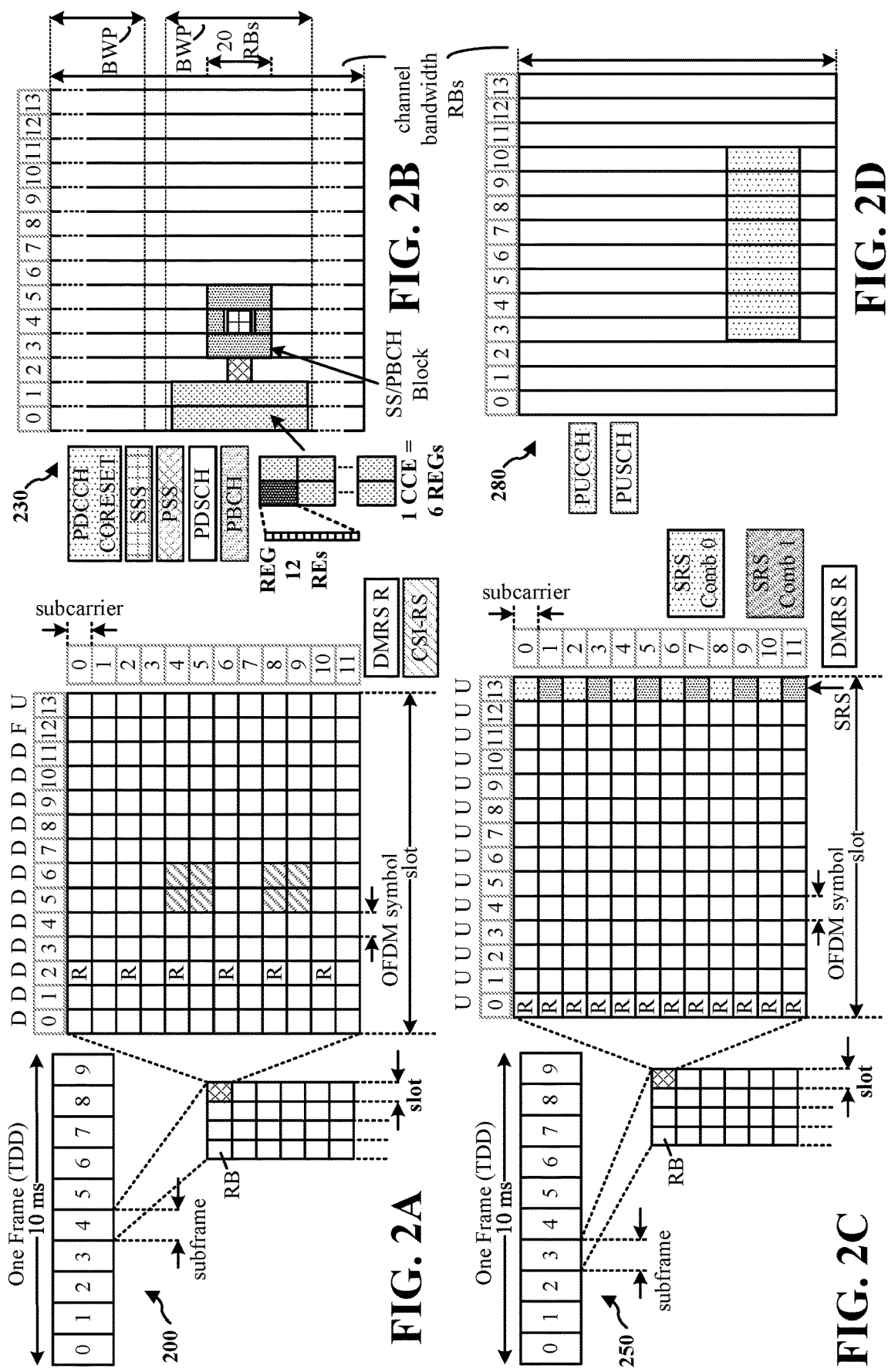
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu *15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame.

The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
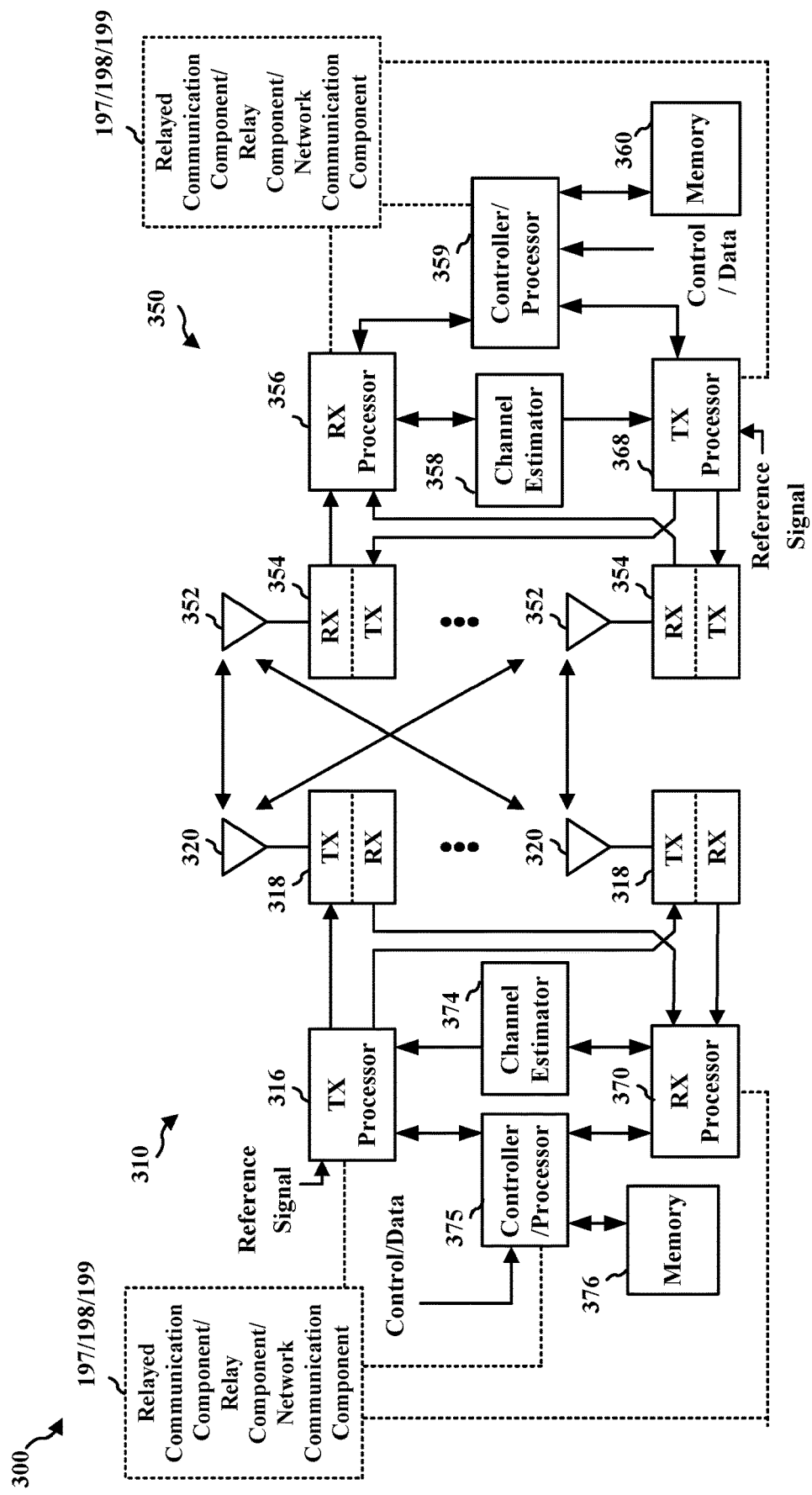
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350.

IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359, the TX processor 316, the RX processor 370, and the controller/processor 375 may be configured to perform aspects in connection with the relayed communication component 197, the relay component 199, or the network communication component 198 of FIG. 1. For example, if the wireless device 310 or 350 is a base station, the wireless device 310 may include the relayed communication component 197. If the wireless device 310 or 350 is a UE, the wireless device may include the relay component 199 and/or the network communication component 198.

A wireless device may support communication with a network entity over a connection based on a first RAT (e.g., a Uu interface) and may support communication with another wireless device over a connection based on a different RAT (e.g., a PC5 interface, a BLE interface, a WiFi-D interface, a WiFi interface, or a BL regular interface, etc.). For example, the wireless device may be another UE having a reduced capability. In non-limiting examples, the wireless device may be a wearable, a sensor, etc., which may be capable of establishing a Uu connection with a network.

In some circumstances, a wireless device may not be able to reach the network entity (e.g., DU and CU) directly using the Uu interface or may determine that the Uu interface is not suitable for current traffic criteria. As an example, the wireless device may move to a location with reduced coverage by the network.

Aspects presented herein enable a wireless device to establish a local connection with a second wireless device (e.g., based on the PC5 interface, the BLE interface, the WiFi-D interface, WiFi interface, the BL interface, etc.) to relay communication between the wireless device and the network entity (e.g., DU and CU). In examples described herein, one device may be described as a "relay UE" and the other device may be referred to as a "remote UE." However, the concepts presented herein are not limited to UEs and may be applied for other wireless devices.

Figure 4:
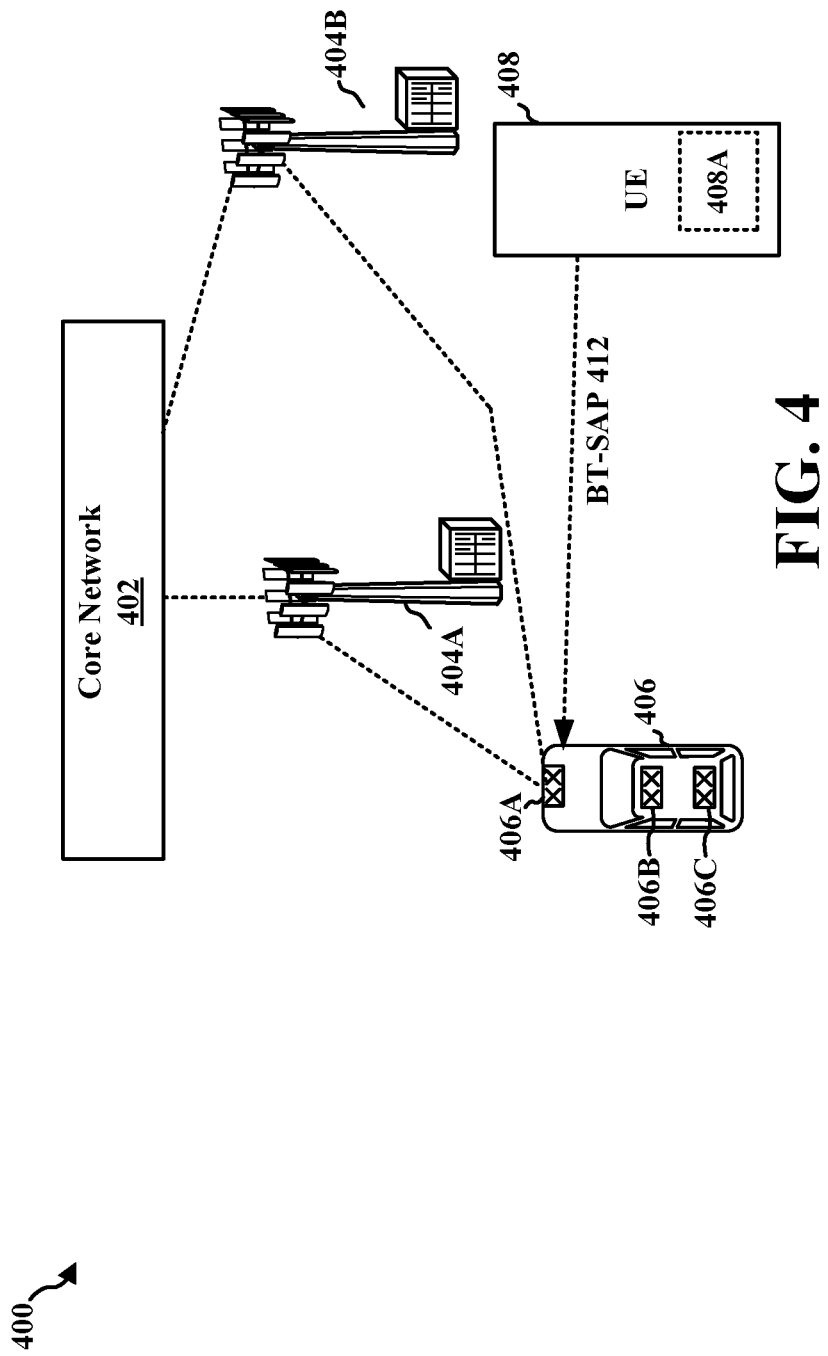
FIG. 4 is a diagram illustrating an example communication system.

A phone UE may be connected to a vehicle UE and may connect to the network via the vehicle UE's antenna. For example, in example 400 illustrated in FIG. 4, a UE 408 (e.g., a non-vehicle UE, a smaller UE, etc.) may be connected to a vehicle UE 406 via BT-SAP 412 and may have the UE's 408 modem disabled. The UE 408 may communicate with one or more base stations 404A and 404B (which in turn exchanges communication with the core network 402) via one or more antennas and a modem of the vehicle UE 408. For example, under user subscriber identity module (SIM) sharing, the phone UE 408 may access data via the modem of the vehicle UE 406 and one or more antennas 406A, 406B, and 406C of the vehicle UE 406. Aspects presented herein overcome potential inefficiencies in such communication systems by enabling a newer and/or more advanced baseband unit and modem on the UE to be used besides the RF components of the vehicle UE based on a user SIM sharing scenario. In some aspects, the UE 408 may have a modem 408A that supports more carriers, or for example mmW access, more frequency bands, etc. compared to the vehicle UE 406. In some aspects, a vehicle module may support multiple modems operating simultaneously (e.g., overlapping in time) for data access. A modem may be used for telematics for the vehicle, and another may be used for user data, e.g., including information and entertainment delivery.

Figure 5:
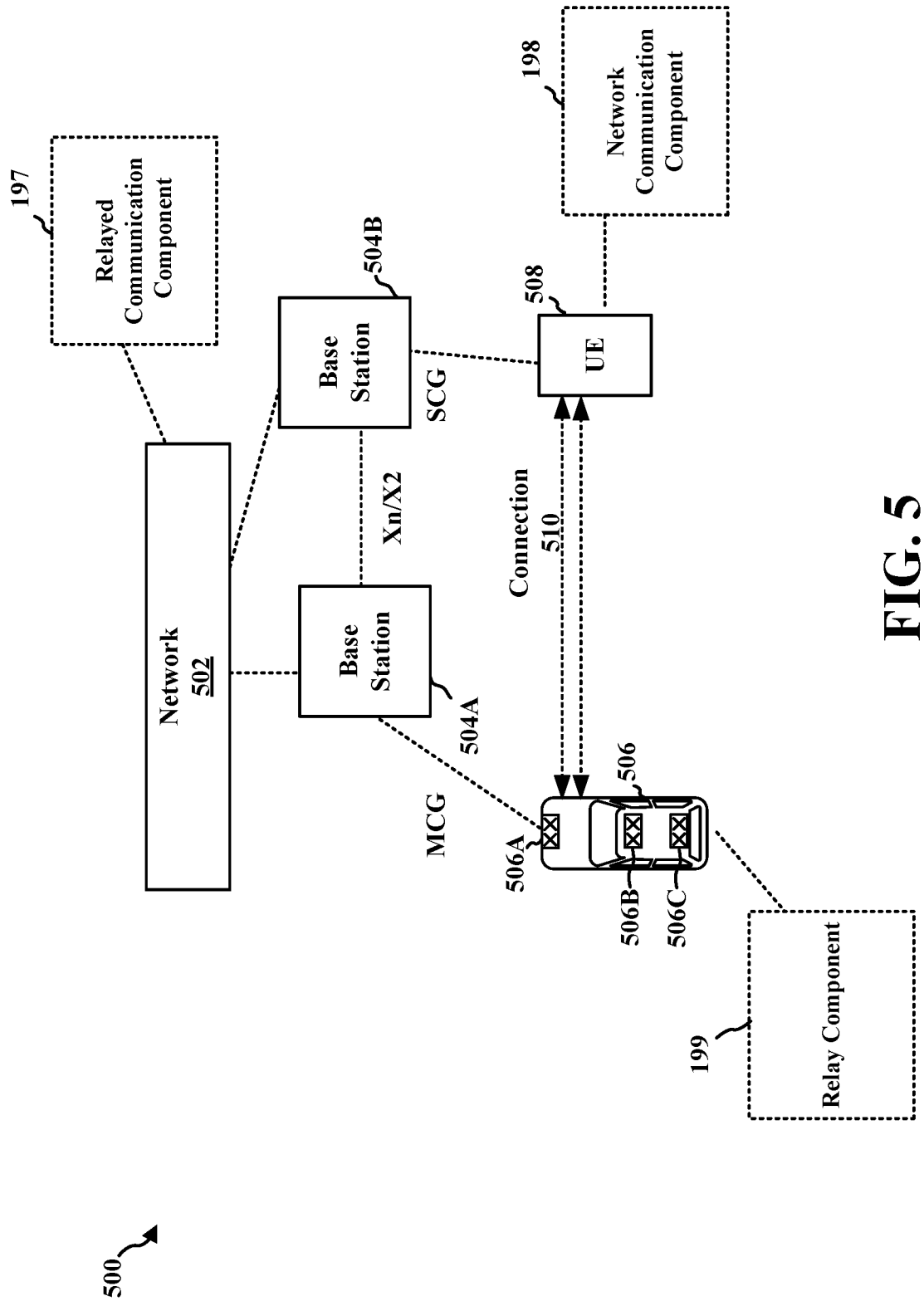
FIG. 5 is a diagram illustrating an example multi radio access technology dual connectivity (MR-DC) framework.

In another example, as illustrated in example 500 illustrated in FIG. 5, the wireless communication network 502 may be associated with the relayed communication component 197 and may be connected to one or more base stations 504A and 504B. The base station 504A may be connected to a vehicle UE 506 (which may be equipped with the relay component 199). The vehicle UE 506 may include one or more antennas 506A, 506B, and 506C. The base station 504B may be connected to a UE 508 (e.g., a non-vehicle UE, such as a phone or other UE) which may be equipped with the network communication component 198. The mobile phone UE 508 may be connected to the base station 504B via a secondary cell group (SCG) and the vehicle UE 506 may be connected to the base station 504A via a master cell group (MCG). The base station 504B may be under the control of base station 504A in providing service to the UEs (506 and 508). The mobile phone UE 508 and the vehicle UE 506 may be connected with each other via connection 510. The connection 510 may be a non-Uu connection such as a sidelink connection, a Bluetooth low energy (BLE) connection, a WiFi-D connection, a WiFi connection, a Bluetooth (BL) connection, a Bluetooth SIM access profile (BT-SAP) session, or the like. In some aspects, the simultaneous access from the vehicle UE 506 and the UE 508 may enable the SCG to be configured for the UE 508 yet may lead the wireless communication network 502 to view the UEs (506 and 508) as one entity.

Figure 6A:
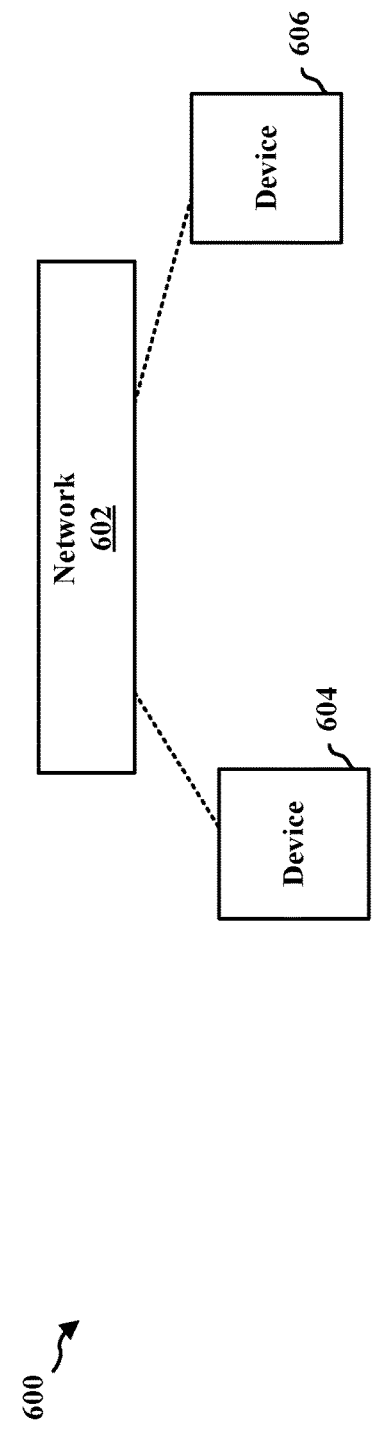
FIGS. 6A and 6B illustrate example connections between network and devices.
Figure 6B:
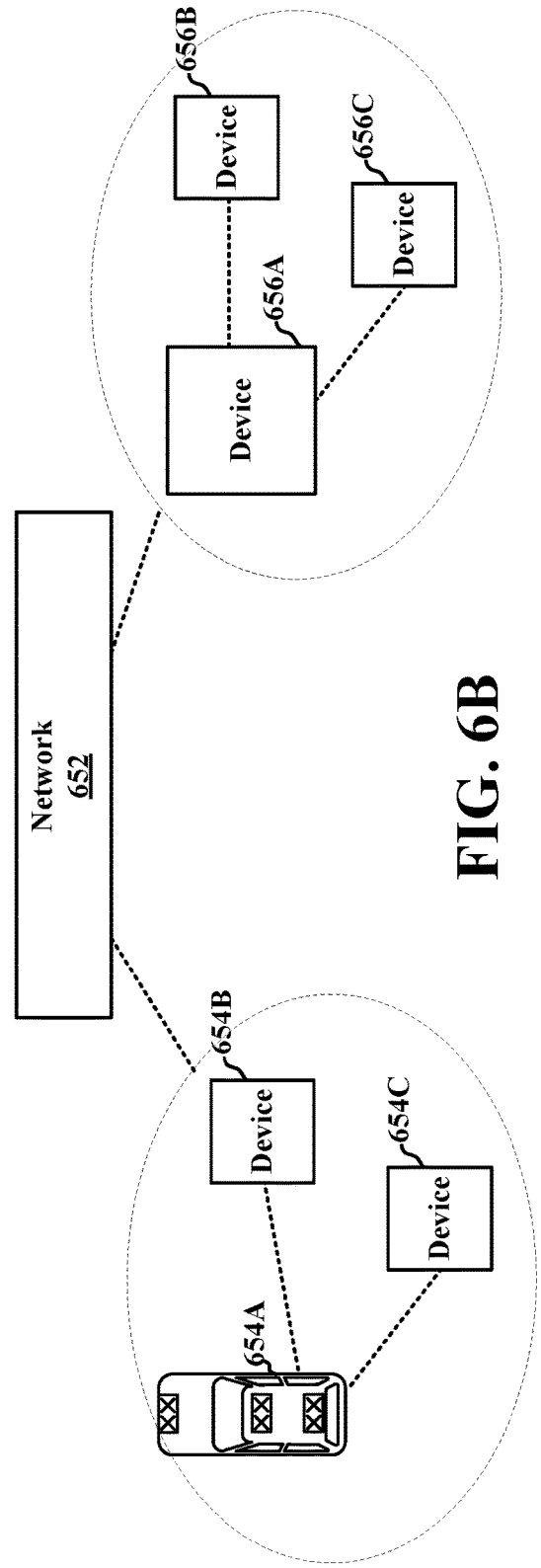

As illustrated in example 600 of FIG. 6A, in some wireless communication systems, the network 602 may have a single connection with a single device 604 and 606. In aspects provided herein, as illustrated in example 650 of FIG. 6B, the network 652 may have a single connection with a group of devices 654A, 654B, 654C and a single connection with a group of devices 656A, 656B, and 656C. For example, the device 654A may be an on board unit (OBU) on a vehicle and the devices 654B and 654C may be a speedometer on the vehicle, navigation system on the vehicle, a pedal control on the vehicle, cameras on the vehicle, or the like. The device 656A may be a phone and the devices 656B and 656C may be a smartwatch, a headphone, a smartglasses, or the like. The group of devices may be visible to the network 652 via sidelink, BLE, WiFi, or the like. In some aspects, a remote device, such as a phone, may be provisioned with two sets of credentials. The first credential may be used to establish a relay connection by a relay UE with a network (e.g., shared with a relay UE such as a vehicle via a connection such as BT-SAP). The second credential may be used to establish a connection with the network via the relay. For example, the first credential may be associated with relay UE operation and may not be valid for sending the relay UE's own data. In some aspects, the network 652 may allow multiple subscriptions for multiple devices to share a single connection. For example, the first subscription may be hosted at the relay device and may include managing the physical connection. Additional subscriptions may be hosted at tethered devices (the devices 654B/656B/654C/656C). Independent end to end (E2E) security and seamless mobility for each tethered device may be provided.

Figure 7A:
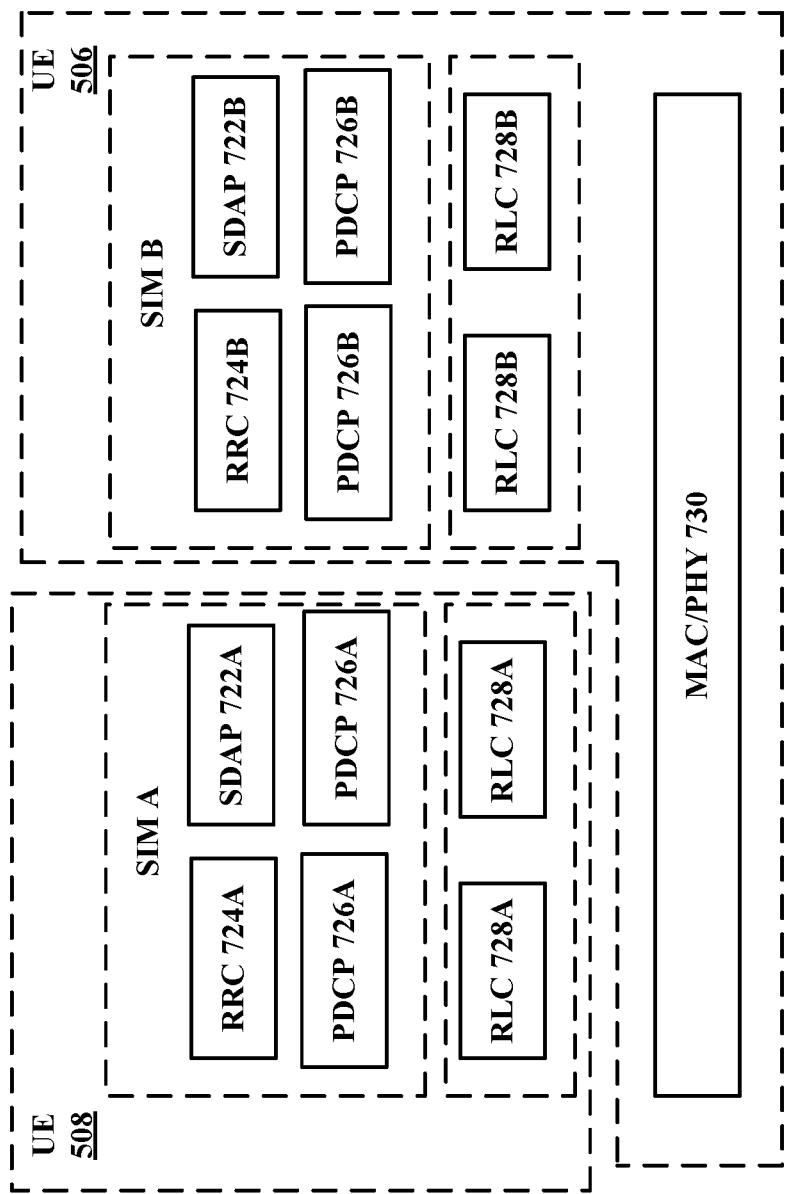
FIGS. 7A-7C illustrate example disaggregate layers of protocol stacks of remote UE and relay UE.
Figure 7B:
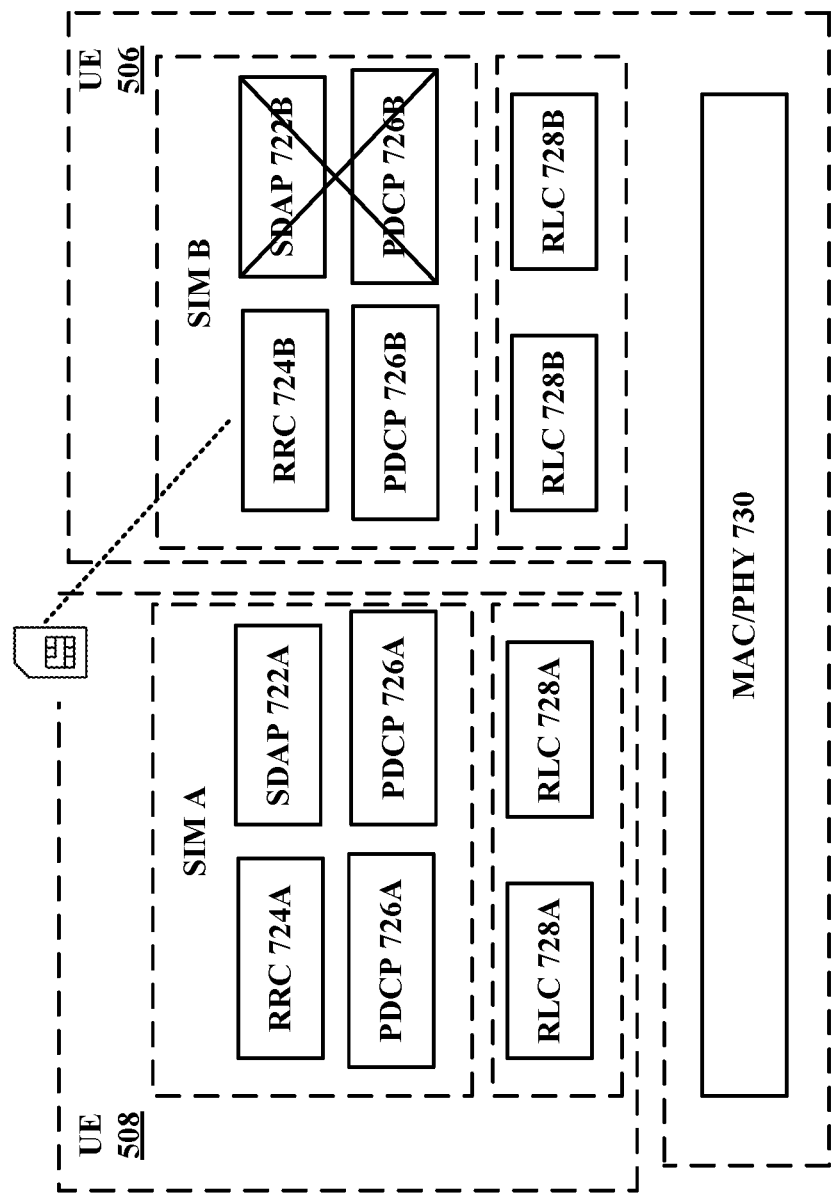
Figure 7C:
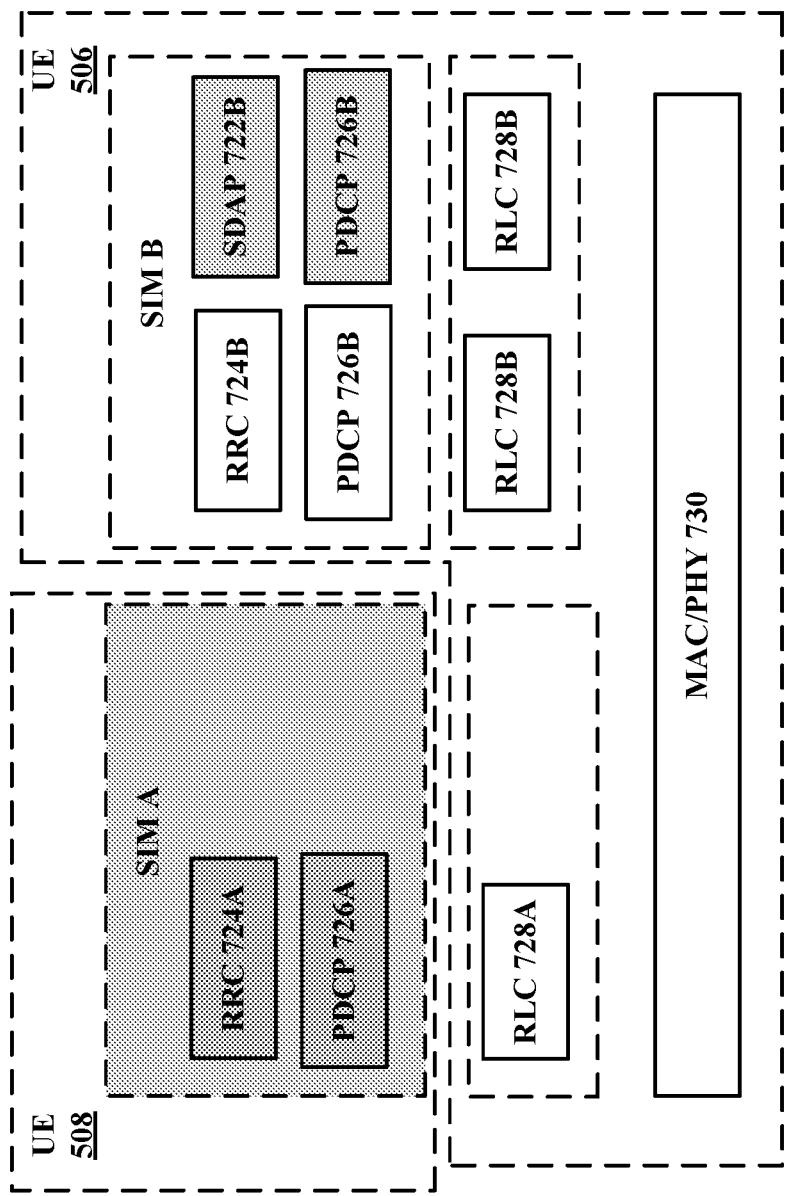

FIGS. 7A-7C illustrate example disaggregate layers of protocol stacks of remote UE and relay UE. As illustrated in example 700 in FIG. 7A, the UE 508 (which may be the remote UE and may be a phone) may include a first SIM (SIM A) that may be associated with RRC 724A, SDAP 722A, and PDCP 726A. The UE 508 may further include RLC 728A. The UE 506 (which may be the relay UE and may be a vehicle) may include a second SIM (SIM B) that may be associated with RRC 724B, SDAP 722B, and PDCP 726B. The UE 508 may further include RLC 728B. The UE 506 and the UE 508 may be associated with a same MAC/PHY 730, such as the MAC/PHY on the UE 506. In some aspects, the relay UE 506 may act as a coverage extension on behalf of the remote UE 508. For example, the relay UE 506 may relay on behalf of remote UE 508 (with wide area network (WAN) subscription). The remote UE 508 may or may not have WAN coverage and may or may not have WAN capabilities. In some aspects, as illustrated in example 750 in FIG. 7B, the SIM of the UE 506 is not used to support data and the UE 508 may share information regarding SIM A with the UE 506. The UE 506 may host the SIM A.

In some aspects, as illustrated in example 770 in FIG. 7C, the relay UE 506 may support hosting U-plane at the relay UE 506. For example, the relay UE 506 may support hosting U-plane at the relay UE 506 to enable advanced split rendering or other offload of processing. In such aspects, the SDAP 722B and PDCP 726B of the UE 506 may support RRC 724A and PDCP 726A of the UE 508.

Figure 8:
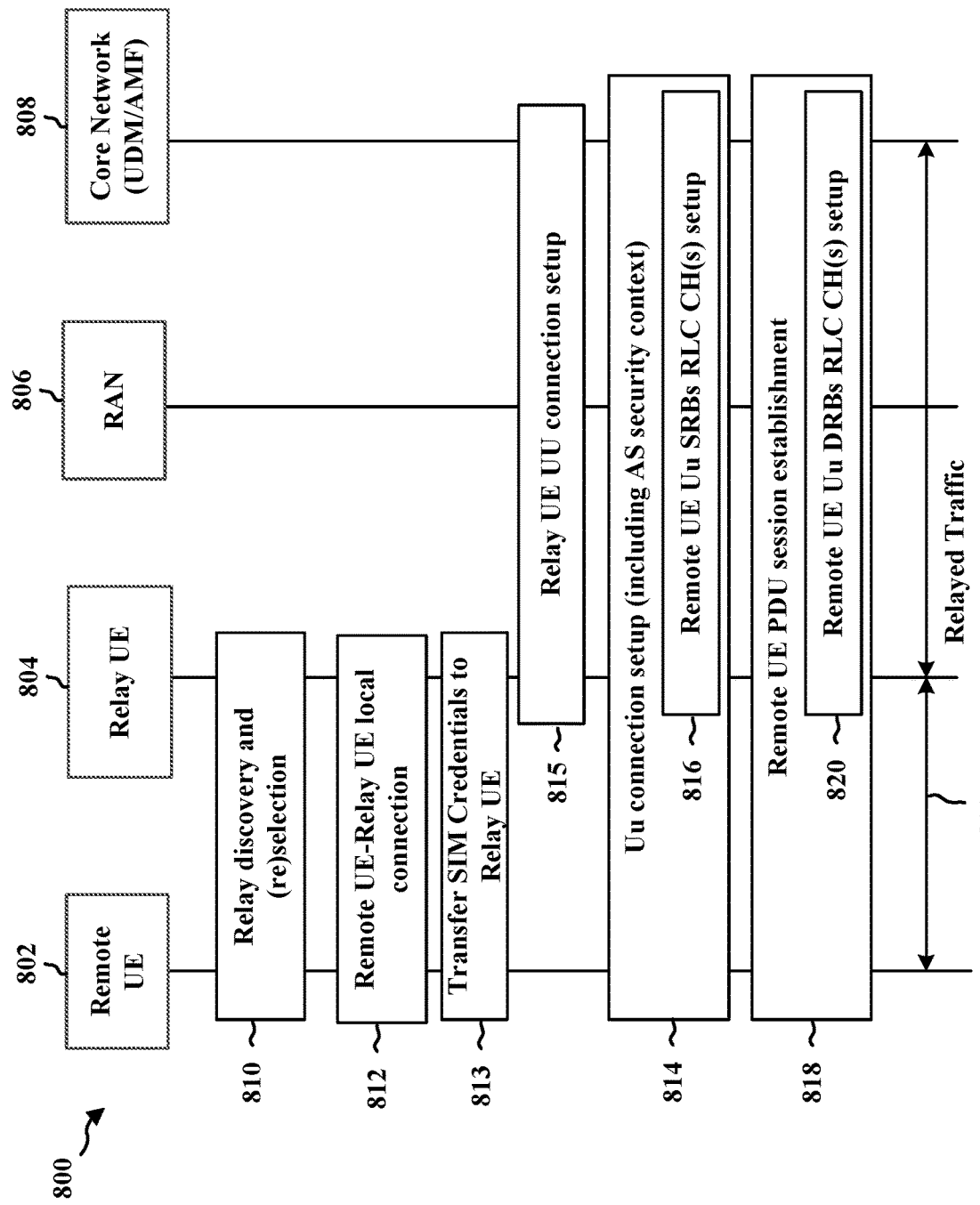
FIG. 8 is a communication flow diagram showing communication exchanged for a first wireless device to establish a connection with a second wireless device in order to exchange communication with a network entity.

FIG. 8 illustrates an example communication flow 800 between a remote UE 802, a relay UE 804, a random access network (RAN) 806, and a core network 808 to establish a connection between the remote UE 802 and the network (e.g., the RAN 806 and/or core network 808). The core network 808 may be an AMF or a UDM of the core network. The UDM may be paired with a user data repository (UDR) that stores the user data such as customer profile information, customer authentication information, and encryption keys for the information to manage data for access authorization, user registration, and data network profiles. The AMF may support termination of NAS signaling, NAS ciphering & integrity protection, registration management, connection management, mobility management, access authentication and authorization, security context management, or the like.

The remote UE 802 may correspond to the wireless device 103 or 508. The relay UE 804 may correspond to the relay UE 104 or 506. At 810, the remote UE 802 and relay UE 804 discovery each other using a discovery procedure based on a locate RAT (e.g., PC5, WiFi, BLE, BL, etc.). Although illustrated as a single step, there may be multiple steps involved in the discovery or reselection procedure 810. For example, the remote UE 802 may discover one or more relay UEs within a range of the remote UE 802. The remote UE 802 may discovery the remote UE 802 based on a discovery message transmitted by the remote UE 802. In some examples, the remote UE may advertise a capability to provide a relay service, e.g., a second type of L2 relay. The second type of L2 relay may be referred to as a remote connection in some examples. The second type of L2 relay may be controlled or managed locally, e.g., by the relay UE and/or the wireless device. For example, the connection between the remote UE 802 and the relay UE 804 may be managed by the remote UE 802 and the relay UE 804 without configuration by a network (e.g., RAN 806 or core network 808). The remote UE 802 and/or the relay UE 804 may provide additional information in the discovery process.

At 812, after discovering the relay UE 804, the remote UE 802 and the remote UE may establish a local connection (e.g., a PC5, WiFi, BLE, BL, or other non-Uu connections). The relay UE 804 and the remote UE 802 may establish the connection, at 812, without control from the RAN 806 or the core network 808, e.g., using a local RAT connection setup procedure.

Because the relay UE 804 may not necessarily have the credentials to access the remote UE 802's home network, at 813, the remote UE 802 may transfer SIM credentials to the relay UE 804. In some aspects, the remote UE 802 may be provisioned with two sets of credentials. The first credential may be used to establish a relay connection with a network (e.g., shared with relay UE such as a vehicle via a connection such as BT-SAP). The second credential may be used to establish a connection with the network via the relay. For example, the first credential may be associated with relay UE operation and may not be valid for sending their own data. For example, the first credential may provide the UE with limited access, e.g., access limited to the relay of wireless traffic for the remote UE 802. In contrast, the second credential may enable the remote UE 802 with full access to the network, e.g., to send and receive data with the network. In some aspects, the remote UE 802 may transfer the first credential or the second credential to the relay UE 804.

After the relay UE 804 receives the credential(s), at 815, the relay UE 804 may establish a Uu connection with the RAN 806 for the relay. In some aspects, at 814, the remote UE establishes one or more of an access stratum (AS) connection or non-AS (NAS) connection and context with a network entity (e.g., RAN 806 or core network 808) via the relay UE 804. The remote UE 802 sends communication for the connection setup to the relay UE 804 that the relay UE 804 transmits the communication to the network. In some aspects, the network sends the connection setup communication for the remote UE 802 to the relay UE 804. In some aspects, the network may configure, at the relay UE 804, a control context setup for the remote UE. In some aspects, at 816, the network 808 or the RAN 806 configures remote UE Uu signaling radio bearer (SRBs) and RLC channel set up for the remote UE 802.

At 818, the network 808 or the RAN 806 establishes or modifies a PDU session for the remote UE 802. In some aspects, the network 808 or the RAN 806 may configure, at the relay UE 804, a data context set up for the remote UE. In some aspects, at 820, the network 808 or the RAN 806 may configure data radio bearer (DRBs) and RLC channel set up for the remote UE 802. In some aspects, the network 808 or the RAN 806 may configure UU RLC channels for the relay UE 804.

Thus, the remote UE establishes an AS connection, NAS connection, and PDU session(s) with the network (e.g., the RAN 806 and/or core network 808) via the relay UE 804 using the local connection established at 812. The network configures the remote UE control and data context (e.g., for Uu control and data) at the relay UE 804. In some aspects, the remote UE 802 and the network (e.g., RAN 806 or core network 808) may exchange traffic 822 via the relay UE 804 for the PDU session configured for the remote UE 802 based on the credentials.

The remote UE 802 may determine to (otherwise referred to as triggered to) connect to a relay UE for various reasons such as serving link quality degradation or failure of source link (Handover (HO) failure (HOF), radio link failure (RLF), or release of non-Uu RAT link). In some examples, the remote UE 802 may determine that the network is not reachable with a direct Uu connection. For example, the remote UE 802 may have a Uu connection at one point and may later determine that remote UE 802 cannot reach the network with a direct Uu connection. In response, the remote UE 802 may then search for, or attempt to discover, a relay UE capable of providing a remote connection relay for the wireless device. In other examples, the remote UE 802 may be capable of establishing a Uu connection with the network yet may determine that the direct connection between the remote UE and the network is not suitable for a particular type of traffic that the remote UE will exchange with the network. In response, the remote UE 802 may then search for, or attempt to discover, a relay UE 804 capable of providing a remote connection relay service for the remote UE 802.

In some aspects, after selecting the relay UE 804 and establishing the connection, at 812, the remote UE may continue to monitor reselection criteria based on the local RAT selection procedure. For example, the remote UE 802 and/or the relay UE 804 may be mobile, and the coverage that the relay UE 804 provides under the local RAT may vary. At times, the remote UE 802 may discover a different relay UE 804 that meets the reselection criteria for the local RAT and may reselect to the other relay UE 804.

Although FIG. 8 illustrates a single remote UE 802, in some examples, the relay UE 804 may provide a relay service to multiple remote devices over the local RAT. In some examples, the relay UE may support up to a particular number of remote UEs. The relay UE 804 may support a dedicated Uu radio link control (RLC) channel for each remote UE. The relay UE and the base station (e.g., RAN 806) may support the relaying to the remote UE 802 without an adaptation layer. The relay UE may use a one-to-one mapping between the Uu RLC channel configured for the remote UE at the relay UE and the local RAT connection to the remote UE. For example, the relay UE 804 may relay traffic from the base station to the remote UE without identifiers for bearer mapping. The remote UE data may be sent over Uu signaling radio bearers (SRBs) and data radio bearers (DRBs). On the local link between the remote UE 802 and the relay UE 804, the relay UE 804 may manage the local connection quality of service (QoS) and context. On the Uu link between the relay UE 804 and the network, the relaying RLC channels and QoS may be configured by the base station based on the remote UE's DRBs. The network may send the remote UE 802 user plane data after performing the connection setup, at 814 and PDU session setup, at 818.

The remote UE may continue monitoring measurements for a Uu connection with the base station. For example, a remote UE that is capable of NR communication may continue monitoring NR measurements configured by the base station, directly or via the L2 relay path. The measurements may include radio resource management (RRM) measurements, for example. The remote UE may send measurement reports to the base station, e.g., directly over a Uu connection or via the L2 relay path using the relay UE. The remote UE may determine a radio link failure based on the measurements for the Uu link and may perform reselection or reestablishment based on the RLF. The relay UE may also perform RRM measurements. If the relay UE determines an RLF for the Uu connection with the network, the relay UE may release or suspend the local RAT connection with the remote UE. The relay UE may inform the remote UE of the RLF. The relay UE may stop advertising discovery of the local RAT or may advertise discovery without an indication of support to function as an L2 relay to the network. If the relay UE determines an RLF for the local RAT that forms the basis of the connection between the remote UE and the relay UE, the relay UE may indicate to the network, e.g., the base station, that there is a RLF for the local connection of the non-Uu interface between the remote UE and the relay UE. The relay UE may release the connection with the remote UE and may inform the base station that the relay connection is being released. The base station may release the remote UE context based on the indication from the relay UE.

In some aspects, upon detecting a non-Uu connection RLF, a remote UE may trigger relay/cell (re)selection and may notify a base station on RLF indication (e.g., in Reestablishment cause). In some aspects, upon detecting a non-Uu connection RLF, a relay UE may notify a base station of remote UE's non-Uu RAT RLF. In some aspects, upon detecting a Uu connection RLF, a relay UE may notify a remote UE via configurator of RLF and may also release or suspend the non-Uu connections. The relay UE may further indicate that the relay service is not available.

Figure 9:
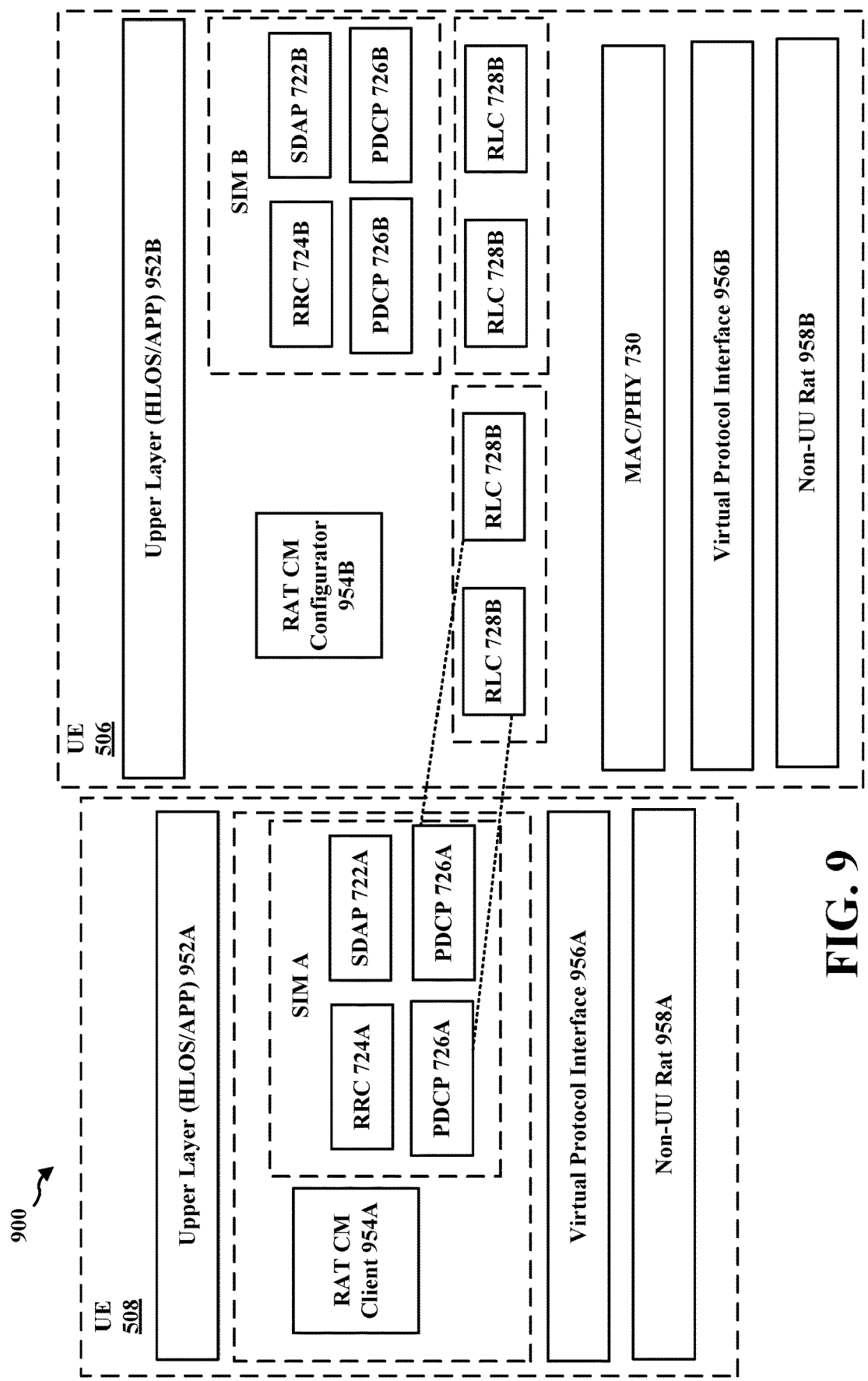
FIG. 9 is an example illustrating inter-device interfaces.

FIG. 9 is an example illustrating inter-device interfaces. As illustrated in example 900 of FIG. 9, the remote UE 508 may include an upper layer 952A that may include highway line of sight (HLOS) component or application layer (APP) component. The remote UE 508 may further include a RAT configuration manager (CM) client 954A and the previously described SIM A and RRC 724A, SDAP 722A, and PDCP 726A. The UE 508 may further include virtual protocol interface (VPI) 956A and non-UU RAT 958A. The relay UE 506 may include an upper layer 952B that may include HLOS/APP. The relay UE 506 may further include a RAT CM configurator 954B and the previously described SIM B and RRC 724B, SDAP 722B, PDCP 726B, and MAC/PHY 730. The relay UE 506 may further include VPI 956B and non-UU RAT 958B. The VPI 956A and 956B may be configured to expose application programming interface (API) between protocol stacks and route. The RAT CM manager may be configured to perform or configure RAT configuration and mapping (App to RAT mapping), protocol configuration (L2 protocols), IP configuration for clients (such as the RAT CM client 954A), credential provisioning (for peer to peer connection), router configuration (for remote to local mapping), network selection, system information and paging support, or the like.

In some aspect, the first credential and the second credential provides the associated radio network access parameters and authorizations, so that the relay UE may be able to select and establish a connection with a wireless network that may serve the remote UE using the second credential. For example, the relay UE may serve on one or more of the cell selection, PLMN selection criteria and priorities. In some other aspect, the first credential may be derived from the second credential by the remote UE locally and shared with the relay UE. For example, the first credential may be generated by the remote UE signal an indication to the core network within the NAS message, and obtaining the corresponding temporary identifier and security context that can be used for relay operation only. For example, a registration request message from the remote UE with additional indicator that a temporary relay credential is requested. when the remote UE was in coverage. The AMF may then assign a special credential container, e.g. Subscription Concealed Identifier (SUCI) or Global Unique Temporary Identifier (GUTI) and security context, and send that back to the remote UE. Remote UE stores this and share that to the relay UE via a local connection, e.g. BT-SAP, BLE, WiFi, etc., when it needs to use the relay to access the network. The AMF may store this to the UDM or UDR, so that when the relay UE use this allocated SUCI and 5G-GUTI to access the network, the corresponding authorization parameters, e.g. limited to relay only, would be retrieved from the UDR or UDM and send to the RAN. The remote UE may also share with the relay UE other information, e.g. PLMN ID to use, or access categories, etc.

Figure 10A:
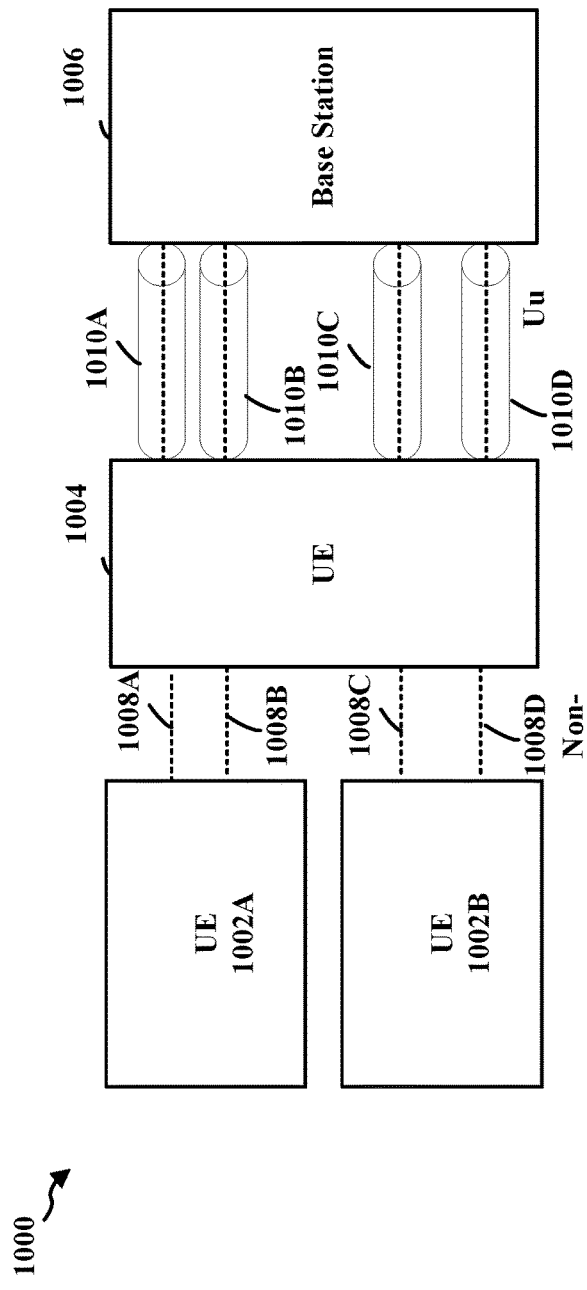
FIGS. 10A-10B illustrate example illustrating example adaptation layer (AL).
Figure 10B:
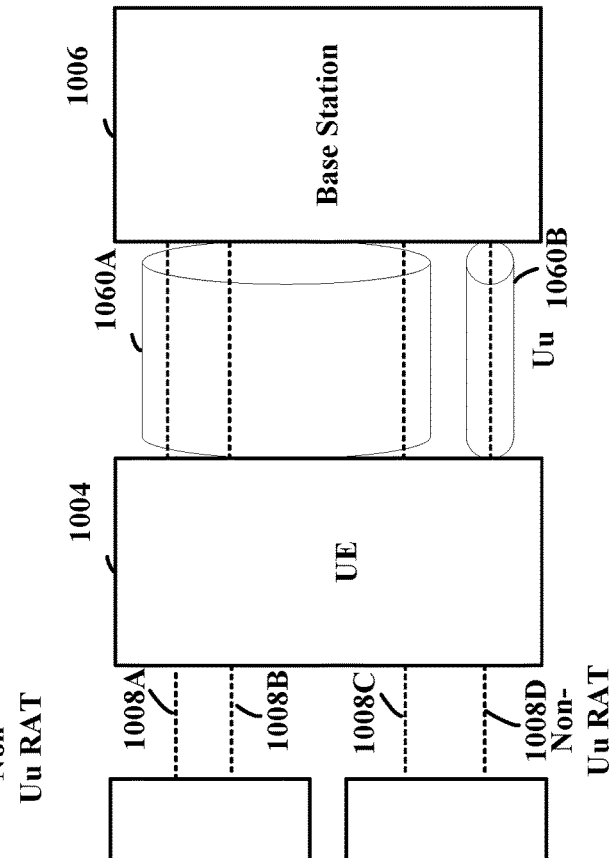

FIGS. 10A-10B illustrate example AL. The AL may be introduced to backhaul for IAB to allow multiplexing of multiple bearers between backhaul and access. As illustrated in example 1000 of FIG. 10A, two remote UEs 1002A and 1002B may be connected to the relay UE 1004. The relay UE 1004 may be connected with the base station 1006. With a 1:1 bearer mapping, the bearers for the non-Uu connections 1008A, 1008B, 1008C, and 1008D for the remote UEs 1002A and 1002B may be 1:1 mapped to bearers for the Uu connection 1010A, 1010B, 1010C, and 1010D between the relay UE 1004 and the base station 1006. In some aspects, the AL may introduce protocol between PDCP and RLC and may be present on a link between the relay UE 1004 and the base station 1006. In some aspects, the AL may be configured by the base station 1006 for the relay UE 1004.

As illustrated in example 1050 of FIG. 10B, with an N:1 bearer mapping, the bearers for the non-Uu connections 1008A, 1008B, 1008C, and 1008D for the remote UEs 1002A and 1002B may be N:1 mapped to bearers for the Uu connection 1060A and 1060B between the relay vehicle UE 1004 and the base station 1006. For example, the bearers 1008A, 1008B and 1008C may be mapped to the bearer 1060A and the bearer 1008D may be mapped to 1060B. With the N:1 mapping of bearers between the Uu connections and non-Uu connections, the remote UEs 1002A and 1002B data may be multiplexed on the Uu connections. Identification of the remote UEs on the Uu connection may be based on the corresponding Uu bearers.

Figure 11:
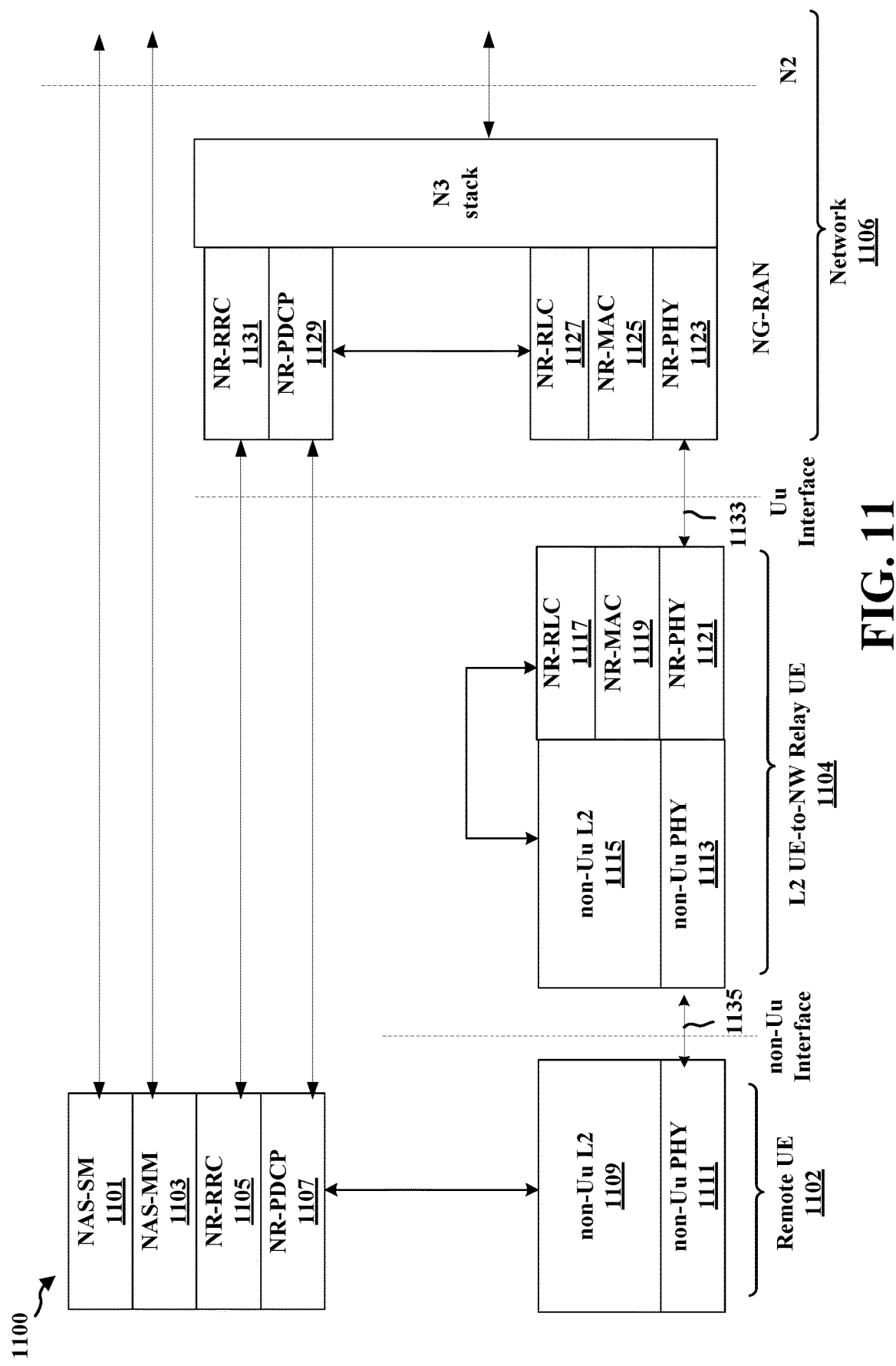
FIG. 11 is an example control plane stack illustrating layers for a first wireless device to establish a connection with a second wireless device for a first type of relay communication with a network entity.

FIG. 11 illustrates an example control plane stack 1100 for relaying traffic between a remote UE 1102 and a network 1106 via a relay UE 1104. The control plane protocol stack is a part of the remote UE 1102 protocol stack, e.g., the NAS session management (NAS-SM) layer 1101, NAS mobility management (NAS-MM) layer 1103, RRC layer 1105, and PDCP layer 1107 for the Uu communication terminate at the remote UE 1102. Thus, the remote UE has the NAS entities and the AS entities. FIG. 11 illustrates the example for NR (e.g., with an NR NAS-SM, NR-MM, NR RRC, and NR PDCP) merely to illustrate the concept of a RAT used with the network 1106. The aspects presented herein may be similarly applied for LTE or other RATs. For example, on the network side, the RRC layer 1131 and the PDCP layer 1129 terminate at the base station, e.g., RAN. The traffic (e.g., the control traffic) passes over the local RAT between the remote UE 1102 and the relay UE 1104, e.g., via the non-Uu layer 2 (L2) 1109 and a non-Uu physical (PHY) layer 1111 that exchanges communication with the non-Uu PHY layer 1113 of the relay UE 1104.

The non-Uu L2 1115 provides the communication to an RLC 1117 for a different RAT than the local connection, e.g., an NR connection in the example in FIG. 11. The RLC passes the communication to a MAC layer 1119 for the other RAT, which provides the communication to a PHY layer 1121 for the other RAT. The communication is exchanged over a Uu interface between the PHY layer 1121 of the relay UE 1104 and the PHY layer 1123 of the network 1106. The PHY layer 1123 provides the communication to the MAC layer 1125 and the RLC layer 1127, PDCP 1129 and SDAP 1131 for the network. As illustrated by the arrows in FIG. 11, messages may be sent from the network 1106 for the remote UE 1102 via the relay UE 1104 or may be sent from the remote UE 1102 to the network 1106 via the relay UE 1104. Although FIG. 11 illustrates the stack for a single remote UE 1102, the relay UE 1104 may have a unique Uu channel 1133 for each remote UE that it supports. For each message for the unique Uu connection 1133 for a remote UE 1102, the relay UE 1104 just relays the communication at the L2 layer to the non-Uu connection 1135. The relay UE 1104 and the network 1106 know that the Uu connection 1133 corresponds to the remote UE, e.g., maps to the remote UE. The relay UE 1104 may use a direct mapping between the Uu link 1133 and the non-Uu link 1135 to relay the message over the L2 without an adaptation layer.

Figure 12:
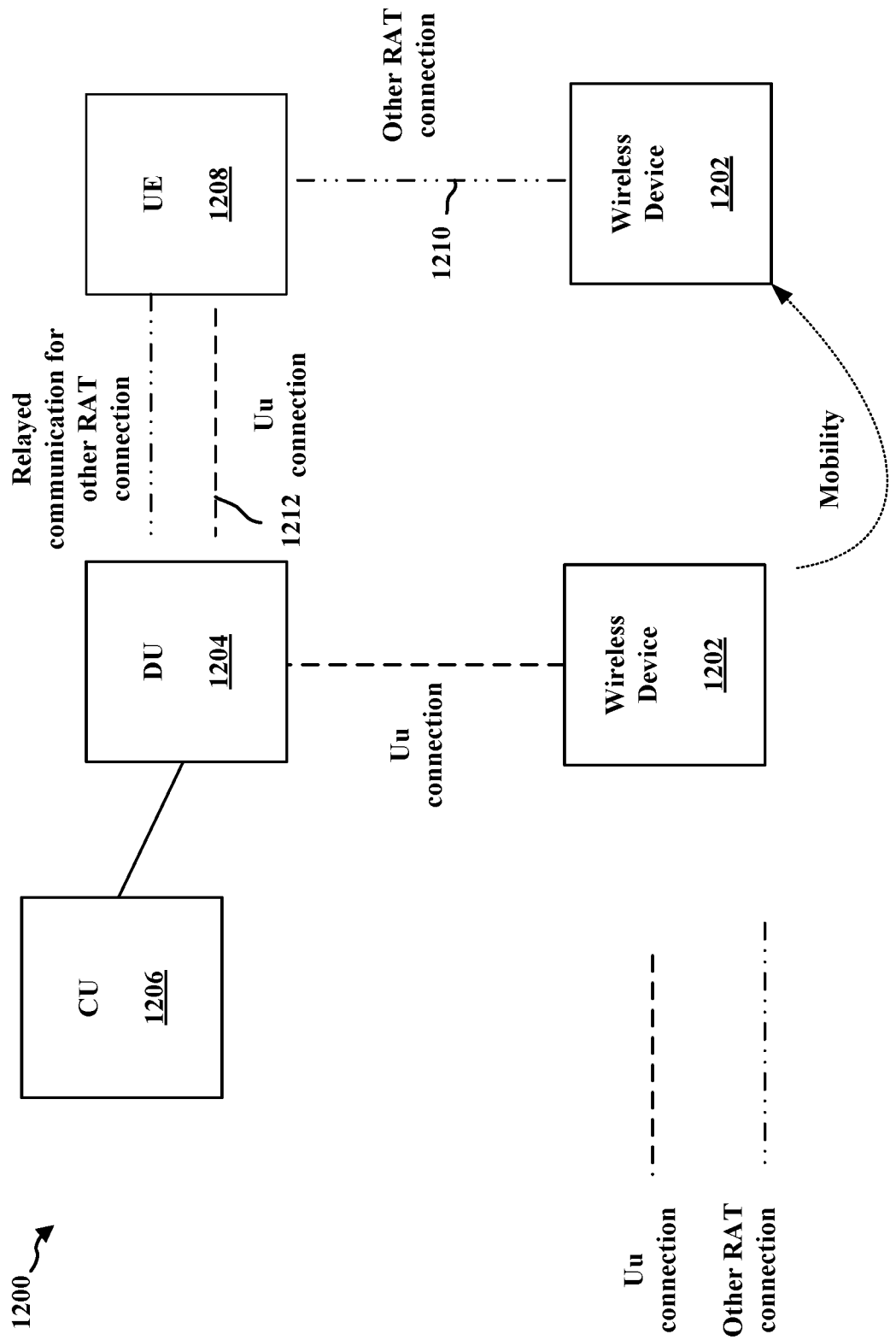
FIG. 12 illustrates a diagram of a first wireless device establishing a connection with a second wireless device in order to exchange communication with a network entity.

FIG. 12 illustrates an example diagram 1200 showing the wireless device 1202 having a Uu connection with a network (e.g., a distributed unit (DU) 1204 and control unit (CU) 1206 of a base station).

In some circumstances, the wireless device 1202 may not be able to reach the network entity (e.g., DU 1204 and CU 1206) using the Uu interface or may determine that the Uu interface is not suitable for current traffic criteria. As an example, the wireless device may move to a location with reduced coverage by the network.

Some aspects may enable the wireless device 1202 to establish a local connection with a second wireless device (e.g., based on the PC5 interface, the BLE interface, the WiFi-D interface, WiFi interface, the BL interface, etc.) to relay communication between the wireless device 1202 and the network entity (e.g., DU 1204 and CU 1202). FIG. 12 illustrates an example in which the second wireless device may be a UE 1208, although other wireless devices may also relay the communication to the wireless device 1202. In examples described herein, the UE 1208 may be described as a "relay UE" and the wireless device 1202 may be referred to as a "remote UE."

The local connection 1210 may be referred to as a remote connection that is established based on a discovery procedure of the RAT of the local connection and may be managed by the second wireless device or the first wireless device itself rather than the network entity. Aspects presented herein enable multiple subscriptions (e.g., a subscription of the multiple UE 1208 and the wireless device 1202) to share a single connection 1212 with the network entity. The second subscription may be hosted remotely on the first wireless device 1202 as a tethered device, e.g., that is tethered to the UE 1208 using the local RAT. Each subscription may be associated with a separate RRC instance at the CU 1206 of the network entity, e.g., a base station. Each RRC instance may be associated with a separate security context (e.g., an access stratum (AS) context and a non-access stratum (NAs) context). Each RRC instance may be associated with a separate control plane context at central unit control plane (CU-CP) and a user plane context at central unit user plane (CU-UP). The separate RRC instances help the network to distinguish between the subscription of the relay UE 1208 and the remote device (e.g., the wireless device 1202).

Some aspects may enable end-to-end security for the wireless device 1202 and may enable seamless mobility for the wireless device 1202 by enabling the wireless device to establish a connection with the network entity via the relay UE 1208 when the Uu connection to the DU 1204 is not available or is not suitable for current traffic.

Figure 13:
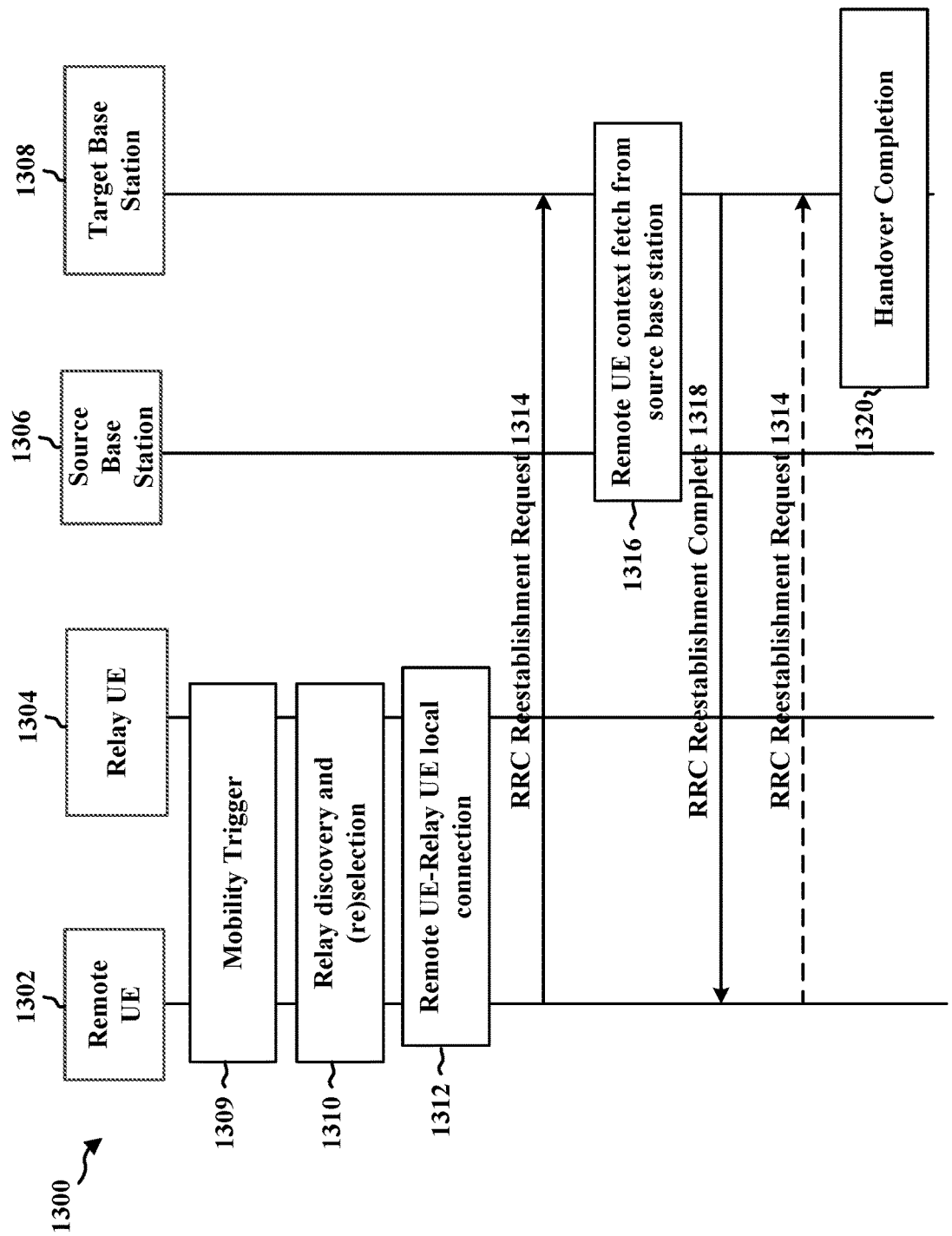
FIG. 13 is a communication flow diagram showing communication exchanged for handover.

FIG. 13 is a communication flow diagram 1300 showing communication exchanged for handover between a remote UE 1302, a relay UE 1304, a source base station 1306, and a target base station 1308.

At 1309, the remote UE 1302 may trigger the handover process based on a variety of reasons such as serving link quality degradation or failure of source link. At 1310, the remote UE 1302 and relay UE 1304 discovery each other using a discovery procedure based on a locate RAT (e.g., PC5, WiFi, BLE, BL, etc.). Although illustrated as a single step, there may be multiple steps involved in the discovery or reselection procedure 1310. For example, the remote UE 802 may discover one or more relay UEs within a range of the remote UE 802. The remote UE 1302 may discovery the remote UE 1302 based on a discovery message transmitted by the remote UE 1302. In some examples, the remote UE may advertise a capability to provide a relay service, e.g., a second type of L2 relay. The second type of L2 relay may be referred to as a remote connection in some examples. The second type of L2 relay may be controlled or managed locally, e.g., by the relay UE and/or the wireless device. For example, the connection between the remote UE 1302 and the relay UE 804 may be managed by the remote UE 802 and the relay UE 1304 without configuration by a network (e.g., RAN 806 or target base station 1308). The remote UE 1302 and/or the relay UE 1304 may provide additional information in the discovery process.

At 1312, after discovering the relay UE 1304, the remote UE 1302 and the remote UE may establish a local connection (e.g., a PC5, WiFi, BLE, BL, or other non-Uu connections). The relay UE 1304 and the remote UE 1302 may establish the connection, at 1312, without control from the source base station 1306 or the target base station 1308, e.g., using a local RAT connection setup procedure. In some aspects, forward HO may be reused to support session continuity. The remote UE 1302 may transmit an RRC reestablishment request 1314 that includes source cell identifiers to the target base station 1308. The RRC reestablishment request 1314 may also include relay UE serving cell identifiers (if the remote UE 1302 is connected to the target base station 1308 via relay path to source). The target base station 1308 may, at 1316, fetch remote UE context from the source base station 1306 based on forward HO. The target base station 1308 may accordingly transmit RRC reestablishment request 1318 to the remote UE 1302. At 1320, the handover may be completed.

Figure 14:
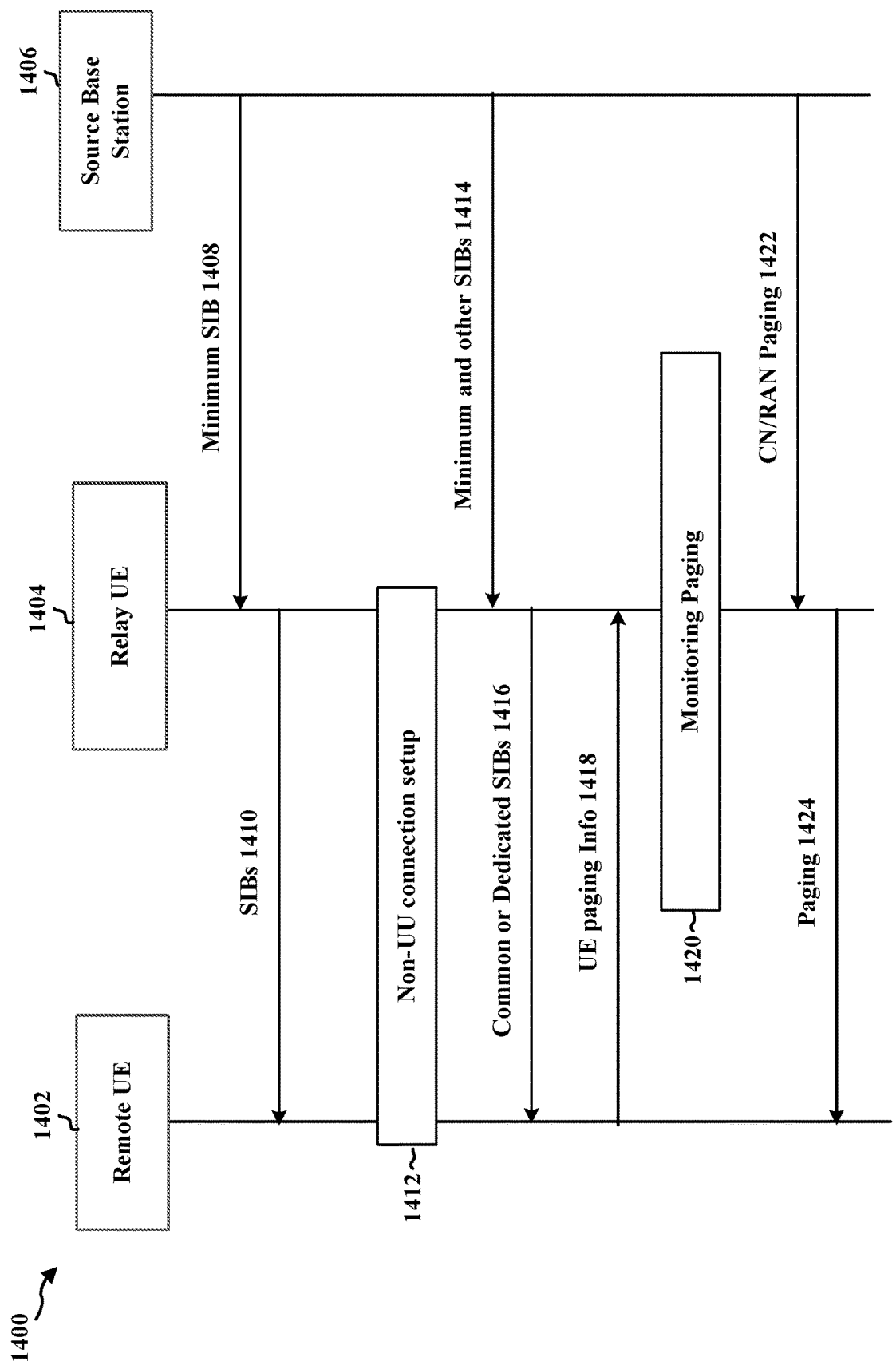
FIG. 14 is a communication flow diagram showing communication exchanged for paging relaying.

FIG. 14 is a communication flow diagram 1400 showing communication exchanged for paging relaying between a remote UE 1402, a relay UE 1404, and a source base station 1406. The remote UE 1402 that may be in coverage may camp on the base station 1406 or may camp on the relay UE 1404 and use out-of-coverage procedure. The source base station 1406 may transmit minimum SIB 1408 to the relay UE 1404. The relay UE 1404 may transmit SIBs 1410 that may include the SIB type 1 (SIB1) and MIB to the remote UE 1402 via groupcast or broadcast to assist the remote UE 1402 with PLMN selection and relay (re)selection. SIB 1 may include cell access related information (e.g. a PLMN identity list, tracking area code, cell identity, or the like), information for cell selection (e.g. minimum required Rx level in the cell and offset), p-Max, frequency band indicator, scheduling information, TDD configuration, SI-window length, system information value tag, or the like. At 1412, the remote UE 1402 may set up non-Uu connection with the relay UE 1404 based on the information received. In some aspects, the base station 1406 may transmit minimum and other SIBs 1414 to the relay UE 1404 and the relay UE 1404 may in turn transmit common or dedicated SIBs 1416 to the remote UE 1402. In some aspects, the common or dedicated SIBs 1416 may be broadcasted or groupcasted. In some aspects, Earthquake and Tsunami Warning System (ETWS)/ Commercial Mobile Alert System (CMAS) notifications, SIB updates, etc., may be transmitted. In some aspects, on-demand SIB supported on non-Uu RAT may be further transmitted. In some aspects, the remote UE 1402 may transmit UE paging information 1418 to the relay UE 1404. The relay UE 1404 may be monitoring for the paging information at 1420. In some aspects, the paging information 1418 may be provided via configuration management (CM) configurator. Based on the paging information 1418, after the relay UE 1404 receives core network/RAN paging 1422 from the source base station 1406, the relay UE 1404 may forward paging 1424 to the remote UE 1402. In some aspects, the relay UE 1404 may filter paging towards the remote UE 1402 based on the paging information provided by the remote UE 1402.

Figure 15:
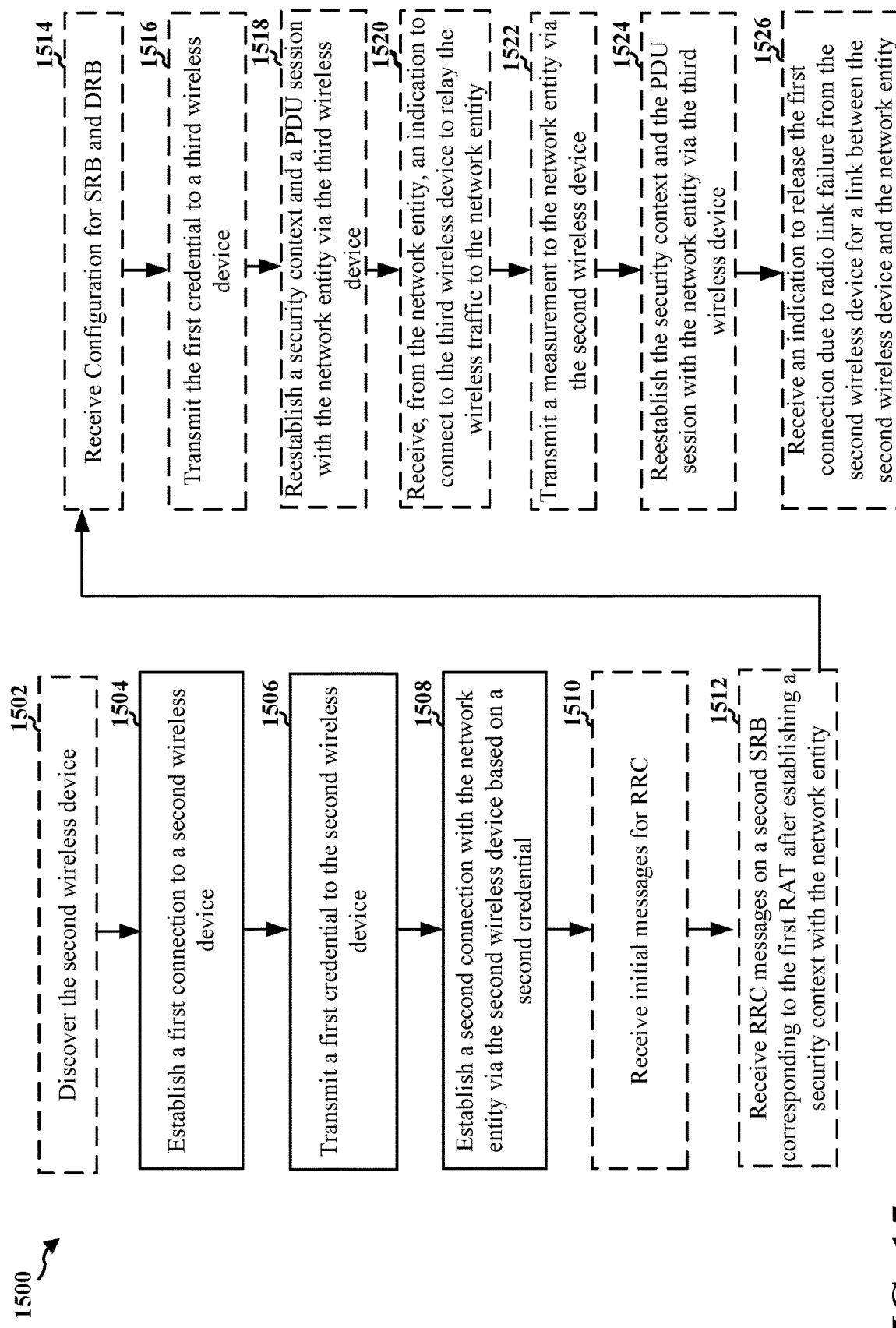
FIG. 15 is a flowchart of a method of wireless communication.

FIG. 15 is a flowchart 1500 of a method of wireless communication. The method may be performed by a first wireless device (e.g., the remote device 103, the remote UE described in connection with any of FIGS. 5-14; the apparatus 1602. Optional steps are illustrated in dashed lines. The steps are not necessarily illustrated in chronological order. The method may enable the first wireless device to connect to a wireless network via the second wireless device, e.g., to employ the additional RF capabilities of the second wireless device in order to communicate more effectively with the network.

At 1502, the first wireless device may discover the second wireless device based on a discovery procedure for a second RAT. In some aspects, 1502 may be performed by discovery component 1654 in FIG. 16. In some aspects, the first wireless device is a UE and the second wireless device is associated with a vehicle. In some aspects, the first wireless device is a first UE and the second wireless device is a second UE. In some aspects, as part of 1502, the first wireless device may receive an indication that the second wireless device supports relaying to the network entity over the first RAT. In some aspects, the first wireless device may be the remote UE in any of FIGS. 5-14. In some aspects, the second wireless device may be the relay UE in any of FIGS. 5-14.

At 1504, the first wireless device may establish a first connection with a second wireless device. In some aspects, 1504 may be performed by first connection component 1640 in FIG. 16. In some aspects, 1504 may be based on determining a link failure with the network entity via a first RAT interface and discovering the second wireless device based on a discovery procedure for a second RAT at 1502. In some aspects, the first connection may be a non-Uu connection.

At 1506, the first wireless device may transmit a first credential to the second wireless device, the first credential associated with relay of wireless traffic between the first wireless device and a network entity. In some aspects, 1506 may be performed by credential component 1650 in FIG. 16. In some aspects, the first credential is limited to the relay of the wireless traffic for the first wireless device.

At 1508, the first wireless device may establish a second connection with the network entity via the second wireless device based on a second credential. In some aspects, 1508 may be performed by second connection component 1642 in FIG. 16. In some aspects, the first connection is a non-Uu connection, and the second connection is a Uu connection. In some aspects, the non-Uu connection is a sidelink connection, a BLE connection, a WiFi-D connection, a WiFi connection, or a BL regular connection. As part of 1508, the first wireless device may establish a context with the network entity via the second wireless device. As part of 1508, the first wireless device may establish a PDU session with the network entity for a first RAT via the second wireless device. In some aspects, the first credential and the second credential may be assigned and provided to the first wireless device by an operator so that the first credential allows the second wireless device to connect to the network (using the first credential) to provide relay services for the first device that may use the second credential to communicate with the network. In some aspects, the first credential is generated based on the second credential with access authorization based on relay operation. For example, the first credential may be generated by the first wireless device based on the second credential with limited access authorization for relay operation. In some aspects, the first credential and the second credential are associated with a same user identifier, such as a user identifier used by an operator of the network for charging and accounting.

At 1510, the first wireless device may receive at least one message for RRC setup, RRC resume, or RRC reestablishment from the network entity via the second wireless device on a first SRB corresponding to the first RAT of the network entity. In some aspects, 1510 may be performed by RRC component 1646 in FIG. 16. At 1512, the first wireless device may receive RRC messages on a second SRB corresponding to the first RAT after establishing a security context with the network entity. In some aspects, 1512 may be performed by RRC component 1646 in FIG. 16.

At 1514, the first wireless device may receive, from the network entity via the second wireless device, a configuration of the second SRB and a DRB for exchanging the wireless traffic with the network entity. In some aspects, 1514 may be performed by SRB/DRB component 1648 in FIG. 16.

At 1516, the first wireless device may transmit the first credential to a third wireless device. In some aspects, 1516 may be performed by credential component 1650 in FIG. 16. At 1518, the first wireless device may reestablish a security context and a PDU session with the network entity via the third wireless device. In some aspects, the first wireless device selects a target path based on a reselection procedure for a RAT for the second connection.

At 1520, the first wireless device may receive, from the network entity, an indication to connect to the third wireless device to relay the wireless traffic to the network entity, wherein the first wireless device selects a target path based on the indication from the network entity. In some aspects, 1520 may be performed by indication component 1644 in FIG. 16.

At 1522, the first wireless device may transmit a measurement to the network entity via the second wireless device. The indication to connect to the third wireless device may be based on the measurement. In some aspects, 1522 may be performed by measurement component 1652 in FIG. 16.

At 1524, the first wireless device may reestablish the security context and the PDU session with the network entity via the third wireless device. At 1526, the first wireless device may receive an indication to release the first connection due to radio link failure from the second wireless device for a link between the second wireless device and the network entity. In some aspects, 1526 may be performed by indication component 1644 in FIG. 16.

Figure 16:
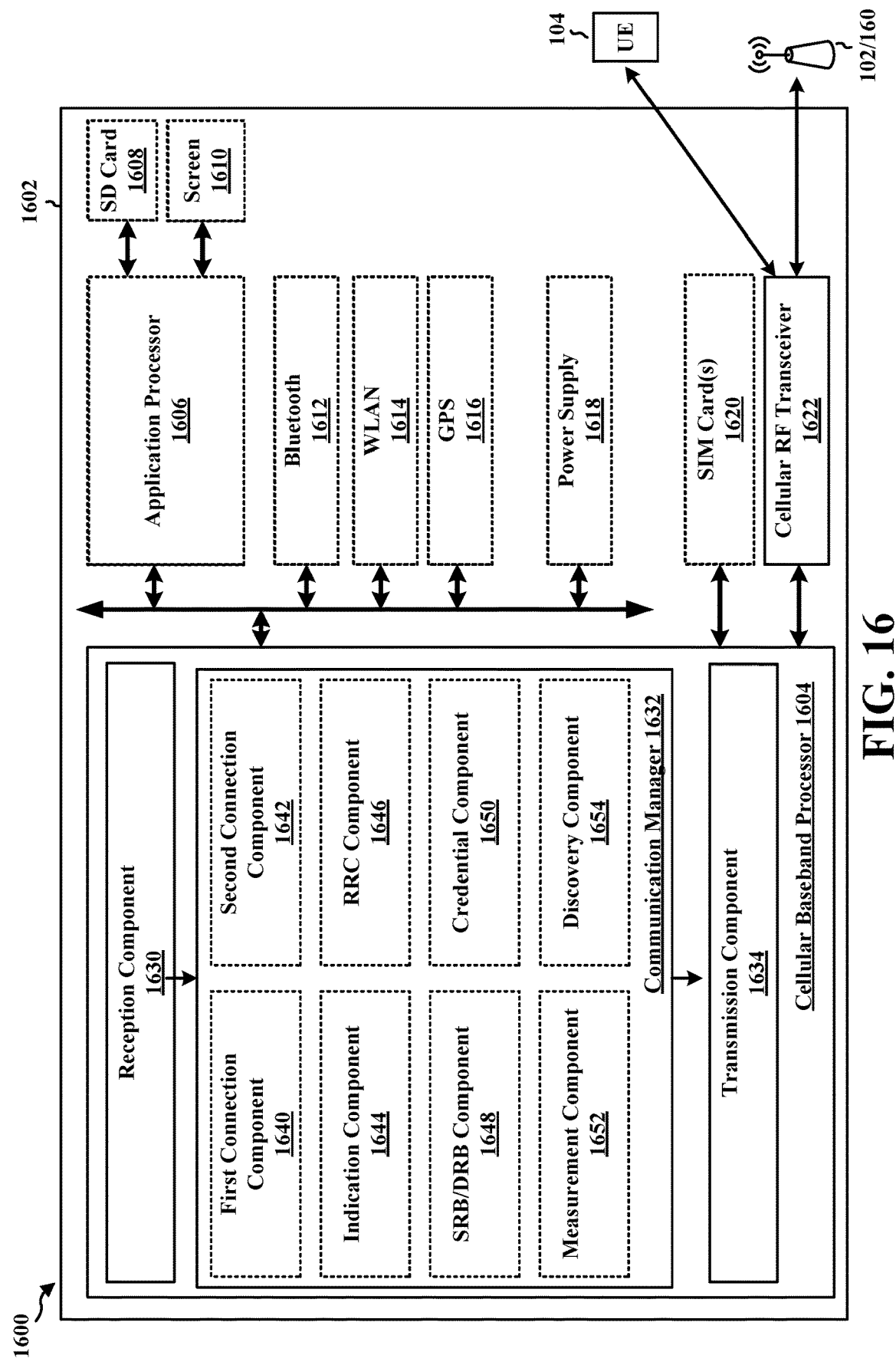
FIG. 16 is a diagram illustrating an example of a hardware implementation for an example apparatus.

FIG. 16 is a diagram 1600 illustrating an example of a hardware implementation for an apparatus 1602. In some aspects, the apparatus 1602 may be a UE or a component of a UE. The apparatus 1602 may include a cellular baseband processor 1604 (also referred to as a modem) coupled to a cellular RF transceiver 1622. In some aspects, the apparatus 1602 may further include one or more subscriber identity modules (SIM) cards 1620, an application processor 1606 coupled to a secure digital (SD) card 1608 and a screen 1610, a Bluetooth module 1612, a wireless local area network (WLAN) module 1614, a Global Positioning System (GPS) module 1616, and/or a power supply 1618. The cellular baseband processor 1604 communicates through the cellular RF transceiver 1622 with the UE 104 and/or BS 102/180. The cellular baseband processor 1604 may include a computer-readable medium/memory. The computer-readable medium/memory may be non-transitory. The cellular baseband processor 1604 is responsible for general processing, including the execution of software stored on the computer-readable medium/memory. The software, when executed by the cellular baseband processor 1604, causes the cellular baseband processor 1604 to perform the various functions described supra. The computer-readable medium/memory may also be used for storing data that is manipulated by the cellular baseband processor 1604 when executing software. The cellular baseband processor 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the cellular baseband processor 1604. The cellular baseband processor 1604 may be a component of the UE 350 and may include the memory 360 and/or at least one of the TX processor 368, the RX processor 356, and the controller/processor 359. In one configuration, the apparatus 1602 may be a modem chip and include just the baseband processor 1604, and in another configuration, the apparatus 1602 may be the entire UE (e.g., see 350 of FIG. 3) and include the additional modules of the apparatus 1602.

The communication manager 1632 may include a first connection component 1640 that is configured to establish a first connection with a second wireless device, e.g., as described in connection with 1504 in FIG. 15. The communication manager 1632 may further include a second connection component 1642 that is configured to establish a second connection with the network entity via the second wireless device based on a second credential, e.g., as described in connection with 1508 in FIG. 15. The communication manager 1632 may further include an indication component 1644 that is configured to receive an indication that the second wireless device supports relaying to the network entity over the first RAT, e.g., as described in connection with 1520 in FIG. 15. The communication manager 1632 may further include an RRC component 1646 that is configured to receive at least one message for RRC setup, RRC resume, or RRC reestablishment from the network entity via the second wireless device on a first SRB corresponding to the first RAT of the network entity and receive RRC messages on a second SRB corresponding to the first RAT after establishing a security context with the network entity, e.g., as described in connection with 1510 and 1512 in FIG. 15. The communication manager 1632 may further include an SRB/DRB component 1648 that is configured to receive, from the network entity via the second wireless device, a configuration of the second SRB and a DRB for exchanging the wireless traffic with the network entity, e.g., as described in connection with 1514 in FIG. 15. The communication manager 1632 may further include a credential component 1650 that is configured to transmit a first credential to the second wireless device, the first credential associated with relay of wireless traffic between the first wireless device and a network entity, e.g., as described in connection with 1506 in FIG. 15. The communication manager 1632 may further include a measurement component 1652 that is configured to transmit a measurement to the network entity via the second wireless device, wherein the indication to connect to the third wireless device is based on the measurement, e.g., as described in connection with 1522 in FIG. 15. The communication manager 1632 may further include a discovery component 1654 that is configured to discover the second wireless device based on a discovery procedure for a second RAT.

The apparatus may include additional components that perform each of the blocks of the algorithm in the aforementioned flowchart of FIG. 15. As such, each block in the aforementioned flowchart of FIG. 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1602, and in particular the cellular baseband processor 1604, includes means for establishing a first connection with a second wireless device, e.g., the communication manager 1632 or the cellular RF transceiver 1622. The cellular baseband processor 1604 may further include means for transmitting a first credential to the second wireless device, the first credential associated with relay of wireless traffic between the first wireless device and a network entity, e.g., the communication manager 1632 or the cellular RF transceiver 1622. The cellular baseband processor 1604 may further include means for establishing a second connection with the network entity via the second wireless device based on a second credential, e.g., the communication manager 1632 or the cellular RF transceiver 1622. The cellular baseband processor 1604 may further include means for determining a link failure with the network entity via a first RAT interface, e.g., the communication manager 1632 or the cellular RF transceiver 1622. The cellular baseband processor 1604 may further include means for discovering the second wireless device based on a discovery procedure for a second RAT, e.g., the communication manager 1632 or the cellular RF transceiver 1622. The cellular baseband processor 1604 may further include means for receiving an indication that the second wireless device supports relaying to the network entity over the first RAT, e.g., the communication manager 1632 or the cellular RF transceiver 1622. The cellular baseband processor 1604 may further include means for establishing a context with the network entity via the second wireless device, e.g., the communication manager 1632 or the cellular RF transceiver 1622. The cellular baseband processor 1604 may further include means for establishing a PDU session with the network entity for a first RAT via the second wireless device, e.g., the communication manager 1632 or the cellular RF transceiver 1622. The cellular baseband processor 1604 may further include means for receiving at least one message for RRC setup, RRC resume, or RRC reestablishment from the network entity via the second wireless device on a first SRB corresponding to the first RAT of the network entity, e.g., the communication manager 1632 or the cellular RF transceiver 1622. The cellular baseband processor 1604 may further include means for receiving RRC messages on a second SRB corresponding to the first RAT after establishing a security context with the network entity, e.g., the communication manager 1632 or the cellular RF transceiver 1622. The cellular baseband processor 1604 may further include means for receiving, from the network entity via the second wireless device, a configuration of the second SRB and a DRB for exchanging the wireless traffic with the network entity, e.g., the communication manager 1632 or the cellular RF transceiver 1622. The cellular baseband processor 1604 may further include means for transmitting the first credential to a third wireless device, e.g., the communication manager 1632 or the cellular RF transceiver 1622. The cellular baseband processor 1604 may further include means for reestablishing a security context and a PDU session with the network entity via the third wireless device, e.g., the communication manager 1632 or the cellular RF transceiver 1622. The cellular baseband processor 1604 may further include means for receiving, from the network entity, an indication to connect to the third wireless device to relay the wireless traffic to the network entity, wherein the first wireless device selects a target path based on the indication from the network entity, e.g., the communication manager 1632 or the cellular RF transceiver 1622. The cellular baseband processor 1604 may further include means for transmitting a measurement to the network entity via the second wireless device, wherein the indication to connect to the third wireless device is based on the measurement, e.g., the communication manager 1632 or the cellular RF transceiver 1622. The cellular baseband processor 1604 may further include means for reestablishing the security context and the PDU session with the network entity via the third wireless device, e.g., the communication manager 1632 or the cellular RF transceiver 1622. The cellular baseband processor 1604 may further include means for receiving an indication to release the first connection due to radio link failure from the second wireless device for a link between the second wireless device and the network entity, e.g., the communication manager 1632 or the cellular RF transceiver 1622.

The aforementioned means may be one or more of the aforementioned components of the apparatus 1602 configured to perform the functions recited by the aforementioned means. As described supra, the apparatus 1602 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 17:
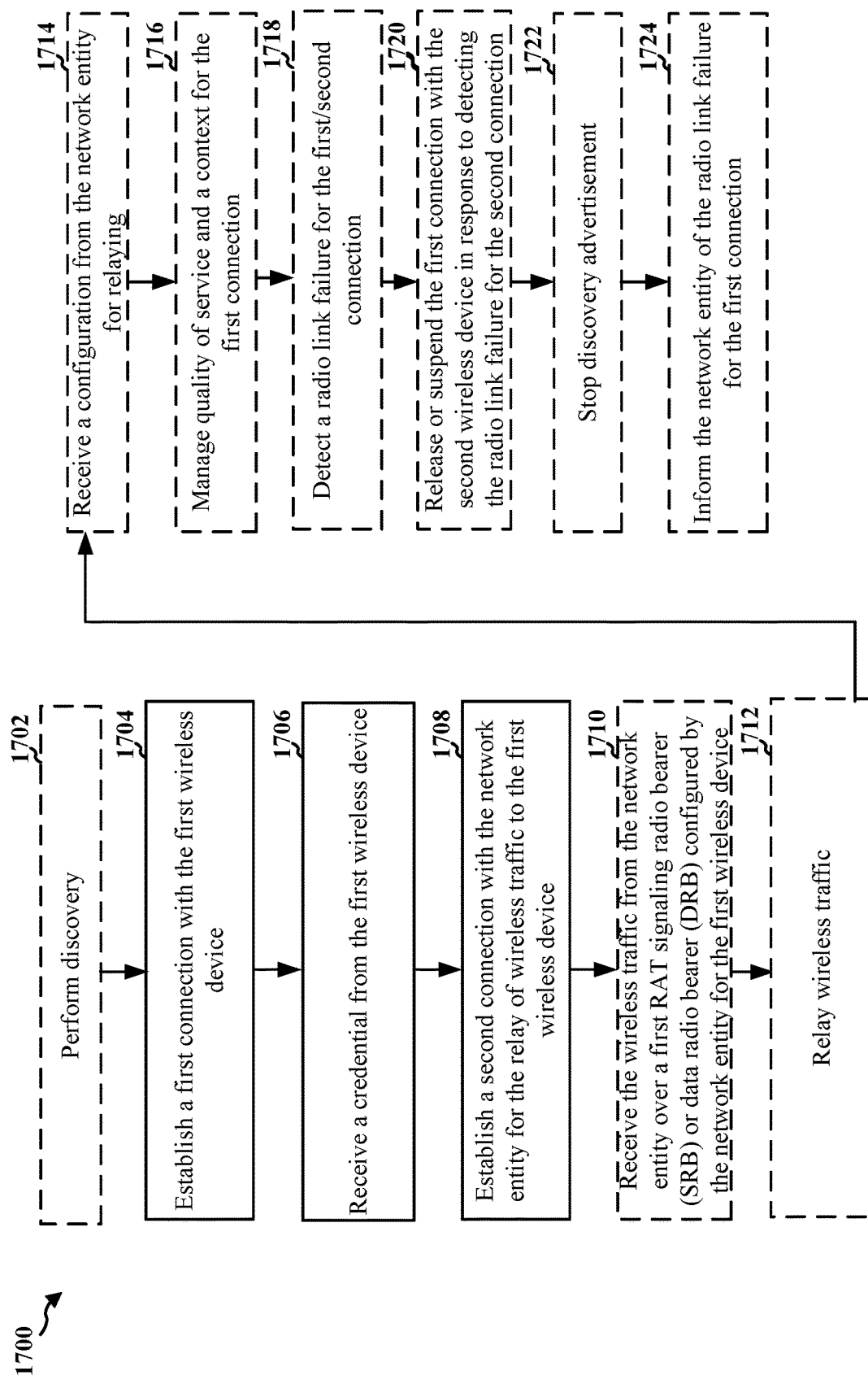
FIG. 17 is a flowchart of a method of wireless communication.

FIG. 17 is a flowchart 1700 of a method of wireless communication. The method may be performed by a second wireless device (e.g., the UE 104, the relay UE described in connection with any of FIGS. 5-14; the apparatus 1802. Optional steps are illustrated in dashed lines. The steps are not necessarily illustrated in chronological order. The method may enable the second wireless device to connect to a wireless network for relaying of wireless traffic for a first wireless device, e.g., to provide the additional RF capabilities of the second wireless device to improve communication for the first wireless device.

At 1702, the second wireless device may perform discovery with the first wireless device based on a discovery procedure for the first RAT. In some aspects, 1702 may be performed by discovery component 1854 in FIG. 18. In some aspects, the first wireless device is a UE and the second wireless device is associated with a vehicle. In some aspects, the first wireless device is a first UE and the second wireless device is a second UE. In some aspects, as part of 1702, the second wireless device may transmit an indication that the second wireless device supports relaying to the network entity with a connection for the second RAT controlled by the first wireless device. In some aspects, the first wireless device may be the remote UE in any of FIGS. 5-14. In some aspects, the second wireless device may be the relay UE in any of FIGS. 5-14.

At 1704, the second wireless device may establish a first connection with the first wireless device. In some aspects, 1704 may be performed by first connection component 1840 in FIG. 18. In some aspects, the first wireless device is a first UE and the second wireless device is a second UE. In some aspects, the first wireless device is a UE and the second wireless device is associated with a vehicle. In some aspects, the first connection may be a non-Uu connection.

At 1706, the second wireless device may receive a credential from the first wireless device, the credential associated with the relay of the wireless traffic between the first wireless device and a network entity. In some aspects, 1706 may be performed by credential component 1850 in FIG. 18. In some aspects, the first credential is limited to the relay of the wireless traffic for the first wireless device.

At 1708, the second wireless device may establish a second connection with the network entity for the relay of wireless traffic between the first wireless device and a network entity, the second connection being established based on the credential received from the first wireless device. In some aspects, 1708 may be performed by second connection component 1842 in FIG. 18. In some aspects, the first connection is a non-Uu connection, and the second connection is a Uu connection. In some aspects, the first connection is for a first RAT that is different than a second RAT for the second connection. In some aspects, the non-Uu connection is a sidelink connection, a BLE connection, a WiFi-D connection, a WiFi connection, or a BL regular connection.

At 1710, the second wireless device may receive the wireless traffic from the network entity over a first RAT SRB or DRB configured by the network entity for the first wireless device. In some aspects, at 1712, the second wireless device relay wireless traffic. For example, in some aspects, as part of 1712, the second wireless device may relay for multiple UEs using a dedicated first RAT RLC channel corresponding with each UE. In some aspects, as part of 1712, the second wireless device may relay the wireless traffic between the network entity and the first wireless device without an adaptation function. In some aspects, as part of 1712, the second wireless device may relay the wireless traffic based on a mapping between a first RAT link with the network entity for relaying to the first wireless device and a second RAT link with the first wireless device. In some aspects, the second wireless device may relay the wireless traffic to the first wireless device over the first connection. In some aspects, 1710 and 1712 may be performed by relay component 1852 of FIG. 18.

At 1714, the second wireless device may receive a configuration from the network entity for a relaying radio link channel and a first quality of service for the second connection based on the first RAT DRB for the first wireless device. In some aspects, at 1716, the second wireless device may manage, by the second wireless device, a second quality of service and a context for the first connection with the first wireless device based on a second RAT. In some aspects, the second wireless device receives a configuration for a first RAT RLC channel for the SRB for the first wireless device and a second first RAT RLC channel for the DRB for the first wireless device. In some aspects, at 1718, the second wireless device may detect a radio link failure for the second connection with the network entity. In some aspects, 1718 may be performed by the second connection component 1842 in FIG. 18.

In some aspects, at 1720, the second wireless device may release or suspend the first connection with the second wireless device in response to detecting the radio link failure for the second connection. In some aspects, 1720 may be performed by the first connection component 1840 in FIG. 18.

In some aspects, at 1722, the second wireless device may stop discovery advertisement for a RAT of the first connection with the second wireless device in response to detecting the radio link failure for the second connection. In some aspects, 1722 may be performed by the first connection component 1840 in FIG. 18.

In some aspects, at 1722, the second wireless device may inform the network entity of the radio link failure for the first connection. In some aspects, 1724 may be performed by the first connection component 1840 in FIG. 18.

Figure 18:
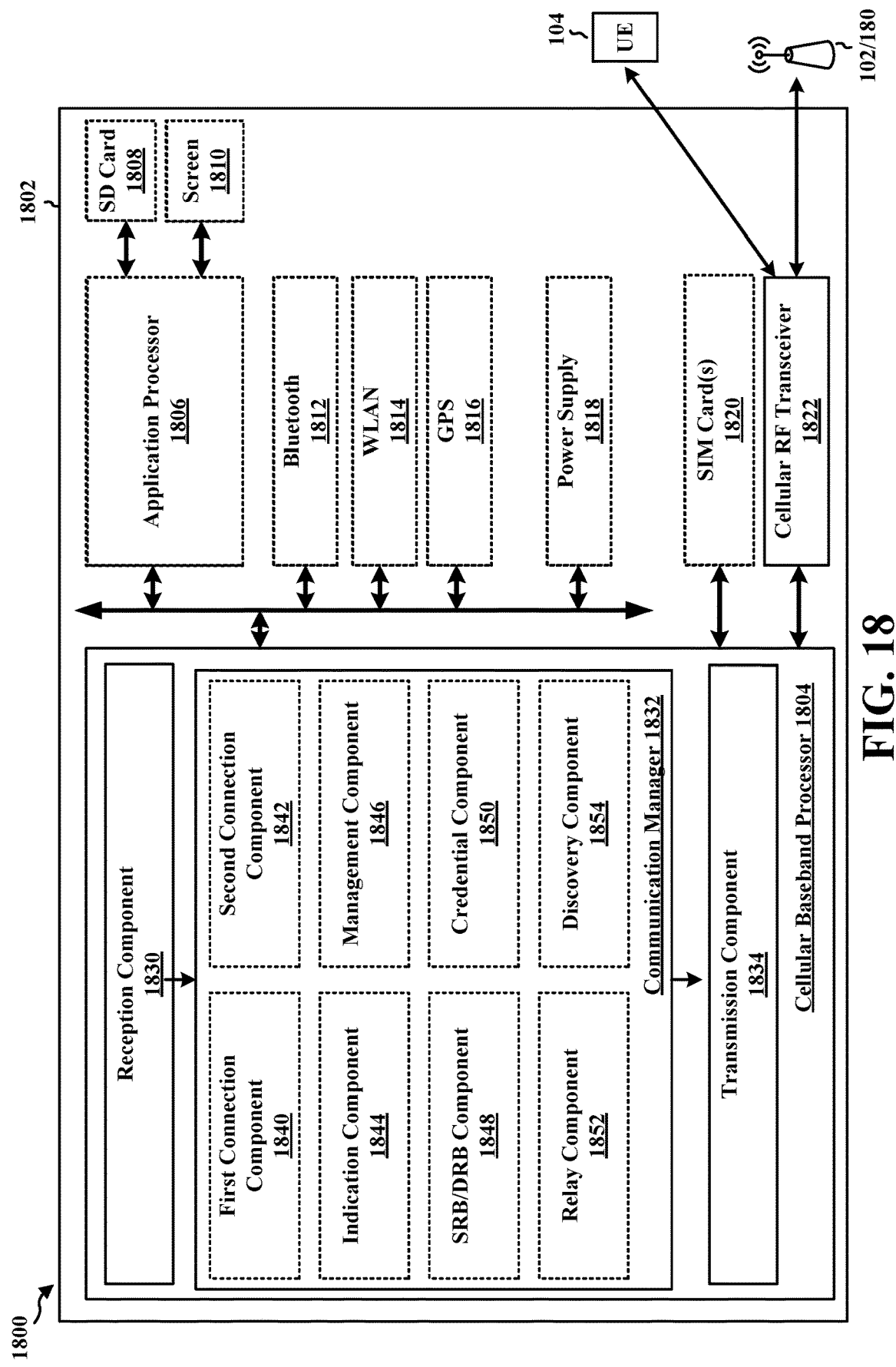
FIG. 18 is a diagram illustrating an example of a hardware implementation for an example apparatus.

FIG. 18 is a diagram 1800 illustrating an example of a hardware implementation for an apparatus 1802. In some aspects, the apparatus 1802 may be a UE or a component of a UE. In some aspects, the apparatus 1802 may include a cellular baseband processor 1804 (also referred to as a modem) coupled to a cellular RF transceiver 1822. The apparatus may include one or more subscriber identity modules (SIM) cards 1820, an application processor 1806 coupled to a secure digital (SD) card 1808 and a screen 1810, a Bluetooth module 1812, a wireless local area network (WLAN) module 1814, a Global Positioning System (GPS) module 1816, and/or a power supply 1818. The cellular baseband processor 1804 communicates through the cellular RF transceiver 1822 with the UE 104 and/or BS 102/180. The cellular baseband processor 1804 may include a computer-readable medium/memory. The computer-readable medium/memory may be non-transitory. The cellular baseband processor 1804 is responsible for general processing, including the execution of software stored on the computer-readable medium/memory. The software, when executed by the cellular baseband processor 1804, causes the cellular baseband processor 1804 to perform the various functions described supra. The computer-readable medium/ memory may also be used for storing data that is manipulated by the cellular baseband processor 1804 when executing software. The cellular baseband processor 1804 further includes a reception component 1830, a communication manager 1832, and a transmission component 1834. The communication manager 1832 includes the one or more illustrated components. The components within the communication manager 1832 may be stored in the computer-readable medium/memory and/or configured as hardware within the cellular baseband processor 1804. The cellular baseband processor 1804 may be a component of the UE 350 and may include the memory 360 and/or at least one of the TX processor 368, the RX processor 356, and the controller/ processor 359. In one configuration, the apparatus 1802 may be a modem chip and include just the baseband processor 1804, and in another configuration, the apparatus 1802 may be the entire UE (e.g., see 350 of FIG. 3) and include the additional modules of the apparatus 1802.

The communication manager 1832 may include a first connection component 1840 that is configured to establish a first connection with the first wireless device, e.g., as described in connection with 1704 in FIG. 17. The communication manager 1832 may further include a second connection component 1842 that is configured to establish a second connection with the network entity for the relay of wireless traffic between the first wireless device and a network entity, e.g., as described in connection with 1708 in FIG. 17. The communication manager 1832 may further include an indication component 1844 that is configured to transmit an indication that the second wireless device supports relaying to the network entity with a connection for the second RAT controlled by the first wireless device. The communication manager 1832 may further include a management component 1846 that is configured to manage, by the second wireless device, a second quality of service and a context for the first connection with the first wireless device based on a second RAT, e.g., as described in connection with 1716 in FIG. 17. The communication manager 1832 may further include an SRB/DRB component 1848 that is configured to receive the wireless traffic from the network entity over a first RAT SRB or DRB configured by the network entity for the first wireless device, e.g., as described in connection with 1714 in FIG. 17. The communication manager 1832 may further include a credential component 1850 that is configured to receive a credential from the first wireless device, the credential associated with the relay of the wireless traffic between the first wireless device and a network entity, e.g., as described in connection with 1706 in FIG. 17. The communication manager 1832 may further include a relay component 1852 that is configured to relay for multiple UEs using a dedicated first RAT RLC channel corresponding with each UE, relay the wireless traffic between the network entity and the first wireless device without an adaptation function, receive the wireless traffic from the network entity over a first RAT SRB or DRB configured by the network entity for the first wireless device, and relay the wireless traffic to the first wireless device over the first connection e.g., as described in connection with 1710 and 1712 in FIG. 17. The communication manager 1832 may further include a discovery component 1854 that is configured to discover the second wireless device based on a discovery procedure for a second RAT.

The apparatus may include additional components that perform each of the blocks of the algorithm in the aforementioned flowchart of FIG. 17. As such, each block in the aforementioned flowchart of FIG. 17 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1802, and in particular the cellular baseband processor 1804, includes means for establishing a first connection with the first wireless device, e.g., the communication manager 1832 or the cellular RF transceiver 1822. The cellular baseband processor 1804 may further include means for receiving a credential from the first wireless device, the credential associated with the relay of the wireless traffic between the first wireless device and a network entity, e.g., the communication manager 1832 or the cellular RF transceiver 1822. The cellular baseband processor 1804 may further include means for establishing a second connection with the network entity for the relay of wireless traffic between the first wireless device and a network entity, the second connection being established based on the credential received from the first wireless device, e.g., the communication manager 1832 or the cellular RF transceiver 1822. The cellular baseband processor 1804 may further include means for performing discovery with the first wireless device based on a discovery procedure for the first RAT, e.g., the communication manager 1832 or the cellular RF transceiver 1822. The cellular baseband processor 1804 may further include means for transmitting an indication that the second wireless device supports relaying to the network entity with a connection for the second RAT controlled by the first wireless device, e.g., the communication manager 1832 or the cellular RF transceiver 1822. The cellular baseband processor 1804 may further include means for performing relaying for multiple UEs using a dedicated first RAT RLC channel corresponding with each UE, e.g., the communication manager 1832 or the cellular RF transceiver 1822. The cellular baseband processor 1804 may further include means for relaying the wireless traffic between the network entity and the first wireless device without an adaptation function, e.g., the communication manager 1832 or the cellular RF transceiver 1822. The cellular baseband processor 1804 may further include means for receiving the wireless traffic from the network entity over a first RAT SRB or DRB configured by the network entity for the first wireless device, e.g., the communication manager 1832 or the cellular RF transceiver 1822. The cellular baseband processor 1804 may further include means for relaying the wireless traffic to the first wireless device over the first connection, e.g., the communication manager 1832 or the cellular RF transceiver 1822. The cellular baseband processor 1804 may further include means for receiving a configuration from the network entity for a relaying radio link channel and a first quality of service for the second connection based on the first RAT DRB for the first wireless device, e.g., the communication manager 1832 or the cellular RF transceiver 1822. The cellular baseband processor 1804 may further include means for managing, by the second wireless device, a second quality of service and a context for the first connection with the first wireless device based on a second RAT, e.g., the communication manager 1832 or the cellular RF transceiver 1822. The cellular baseband processor 1804 may further include means for detecting a radio link failure for the second connection with the network entity, e.g., the communication manager 1832 or the cellular RF transceiver 1822. The cellular baseband processor 1804 may further include means for releasing or suspending the first connection with the second wireless device in response to detecting the radio link failure for the second connection, e.g., the communication manager 1832 or the cellular RF transceiver 1822. The cellular baseband processor 1804 may further include means for detecting a radio link failure for the second connection with the network entity, e.g., the communication manager 1832 or the cellular RF transceiver 1822. The cellular baseband processor 1804 may further include means for stopping discovery advertisement for a RAT of the first connection with the second wireless device in response to detecting the radio link failure for the second connection, e.g., the communication manager 1832 or the cellular RF transceiver 1822. The cellular baseband processor 1804 may further include means for detecting a radio link failure for the first connection with the second wireless device, e.g., the communication manager 1832 or the cellular RF transceiver 1822.

The aforementioned means may be one or more of the aforementioned components of the apparatus 1802 configured to perform the functions recited by the aforementioned means. As described supra, the apparatus 1802 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 19:
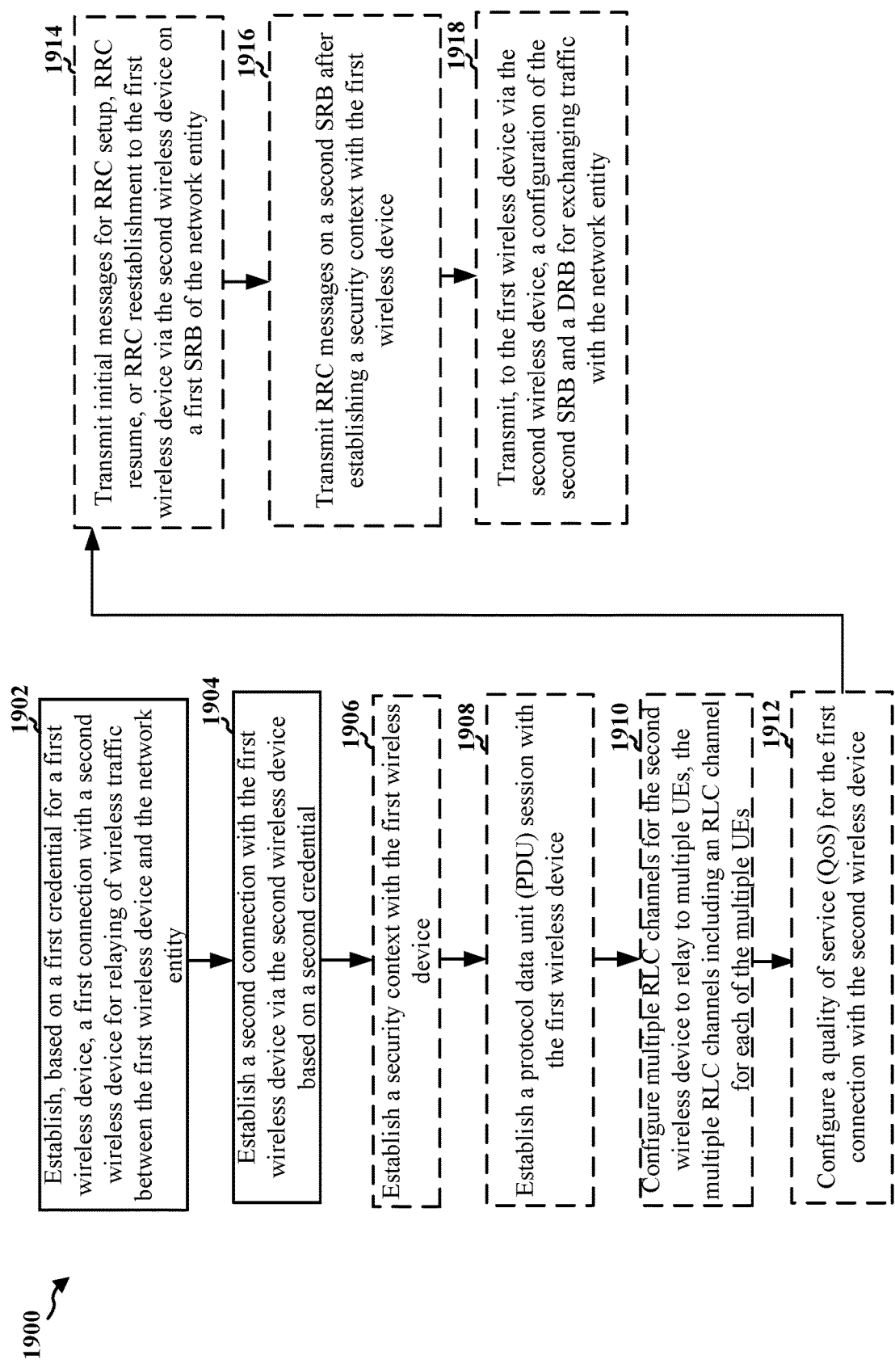
FIG. 19 is a flowchart of a method of wireless communication.

FIG. 19 is a flowchart 1900 of a method of wireless communication. The method may be performed by a network entity (e.g., the base station 102/180, the base station or core network described in connection with any of FIGS. 5-14; the apparatus 2002). Optional steps are illustrated in dashed lines. The steps are not necessarily illustrated in chronological order.

At 1902, the network entity may establish, based on a first credential for a first wireless device, a first connection with a second wireless device for relaying of wireless traffic between the first wireless device and the network entity. In some aspects, 1902 may be performed by first connection component 2040 in FIG. 20. The first wireless device may correspond with a remote UE described in connection with FIGS. 5-14 and the second wireless device may correspond with a relay UE described in connection with FIGS. 5-14. In some aspects, the first connection may be a Uu connection. In some aspects, the first credential is limited to the relay of the wireless traffic for the first wireless device. In some aspects, the first wireless device is a UE and the second wireless device is associated with a vehicle. In some aspects, the first wireless device is a first UE and the second wireless device is a second UE.

At 1904, the network entity may establish a second connection with the first wireless device via the second wireless device based on a second credential. In some aspects, 1904 may be performed by second connection component 2042 in FIG. 20.

In some aspects, as part of establishing the second connection to the second wireless device, at 1906, the network entity may establish a security context with the first wireless device. In some aspects, 1906 may be performed by context component 2054 in FIG. 20.

In some aspects, as part of establishing the second connection to the second wireless device, at 1908, the network entity may establish a PDU session with the first wireless device. In some aspects, 1908 may be performed by PDU component 2052 in FIG. 20. In some aspects, the first connection comprises a Uu connection.

At 1910, the network entity may configure multiple RLC channels for the second wireless device to relay to multiple UEs, the multiple RLC channels including an RLC channel for each of the multiple UEs. In some aspects, 1910 may be performed by RLC component 2044 in FIG. 20. At 1912, the network entity may configure a QoS for the first connection with the second wireless device. In some aspects, 1912 may be performed by configuration component 2050 in FIG. 20.

At 1914, the network entity may transmit at least one message for RRC setup, RRC resume, or RRC reestablishment to the first wireless device via the second wireless device on a first SRB of the network entity. In some aspects, 1914 may be performed by RRC component 2046 in FIG. 20.

At 1916, the network entity may transmit RRC messages on a second SRB after establishing a security context with the first wireless device. In some aspects, 1916 may be performed by RRC component 2046 in FIG. 20. At 1918, the network entity may transmit, to the first wireless device via the second wireless device, a configuration of the second SRB and a DRB for exchanging traffic with the network entity. In some aspects, 1918 may be performed by SRB/DRB component 2048 in FIG. 20.

FIG. 20 is a diagram 2000 illustrating an example of a hardware implementation for an apparatus 2002. The apparatus 2002 may be a network entity. In some aspects, the apparatus 2002 may be a base station or a component of a base station. In some aspects, the apparatus may correspond to an entity of a core network component such as a UDM or AMF. The apparatus may include a baseband unit 2004. The baseband unit 2004 may communicate through a cellular RF transceiver with the UE 104. The baseband unit 2004 may include a computer-readable medium/memory. The baseband unit 2004 is responsible for general processing, including the execution of software stored on the computer-readable medium/memory. The software, when executed by the baseband unit 2004, causes the baseband unit 2004 to perform the various functions described supra. The computer-readable medium/memory may also be used for storing data that is manipulated by the baseband unit 2004 when executing software. The baseband unit 2004 further includes a reception component 2030, a communication manager 2032, and a transmission component 2034. The communication manager 2032 includes the one or more illustrated components. The components within the communication manager 2032 may be stored in the computer-readable medium/memory and/or configured as hardware within the baseband unit 2004. The baseband unit 2004 may be a component of the BS 310 and may include the memory 376 and/or at least one of the TX processor 316, the RX processor 370, and the controller/processor 375.

The communication manager 2032 may include a first connection component 2040 that may establish, based on a first credential for a first wireless device, a first connection with a second wireless device for relaying of wireless traffic between the first wireless device and the network entity, e.g., as described in connection with 1902 in FIG. 19. The communication manager 2032 may further include a second connection component 2042 that may establish a second connection with the first wireless device via the second wireless device based on a second credential, e.g., as described in connection with 1904 in FIG. 19. The communication manager 2032 may further include an RLC component 2044 that may configure multiple RLC channels for the second wireless device to relay to multiple UEs, the multiple RLC channels including an RLC channel for each of the multiple UEs, e.g., as described in connection with 1910 in FIG. 19. The communication manager 2032 may further include an RRC component 2046 that may transmit at least one message for RRC setup, RRC resume, or RRC reestablishment to the first wireless device via the second wireless device on a first SRB of the network entity and transmit RRC messages on a second SRB after establishing a security context with the first wireless device, e.g., as described in connection with 1914 and 1916 in FIG. 19. The communication manager 2032 may further include an SRB/DRB component 2048 that may transmit, to the first wireless device via the second wireless device, a configuration of the second SRB and a DRB for exchanging traffic with the network entity, e.g., as described in connection with 1918 in FIG. 19. The communication manager 2032 may further include a configuration component 2050 that may configure a QoS for the first connection with the second wireless device, e.g., as described in connection with 1912 in FIG. 19. The communication manager 2032 may further include a PDU component 2052 that may establish a PDU session with the first wireless device, e.g., as described in connection with 1908 in FIG. 19. The communication manager 2032 may further include a context component 2054 that may establish a security context with the first wireless device, e.g., as described in connection with 1906 in FIG. 19.

The apparatus may include additional components that perform each of the blocks of the algorithm in the aforementioned flowchart of FIG. 19. As such, each block in the aforementioned flowchart of FIG. 19 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 2002, and in particular the baseband unit 2004, includes means for establishing, based on a first credential for a first wireless device, a first connection with a second wireless device for relaying of wireless traffic between the first wireless device and the network entity, e.g., the communication manager 2032 or a transceiver. The baseband unit 2004 may further include means for establishing a second connection with the first wireless device via the second wireless device based on a second credential, e.g., the communication manager 2032 or a transceiver. The baseband unit 2004 may further include means for establishing a security context with the first wireless device, e.g., the communication manager 2032 or a transceiver. The baseband unit 2004 may further include means for establishing a PDU session with the first wireless device, e.g., the communication manager 2032 or a transceiver. The baseband unit 2004 may further include means for configuring multiple RLC channels for the second wireless device to relay to multiple UEs, the multiple RLC channels including an RLC channel for each of the multiple UEs, e.g., the communication manager 2032 or a transceiver. The baseband unit 2004 may further include means for configuring a QoS for the first connection with the second wireless device, e.g., the communication manager 2032 or a transceiver. The baseband unit 2004 may further include means for transmitting at least one message for RRC setup, RRC resume, or RRC reestablishment to the first wireless device via the second wireless device on a first SRB of the network entity, e.g., the communication manager 2032 or a transceiver. The baseband unit 2004 may further include means for transmitting RRC messages on a second SRB after establishing a security context with the first wireless device, e.g., the communication manager 2032 or a transceiver. The baseband unit 2004 may further include means for transmitting, to the first wireless device via the second wireless device, a configuration of the second SRB and a DRB for exchanging traffic with the network entity, e.g., the communication manager 2032 or a transceiver.

The aforementioned means may be one or more of the aforementioned components of the apparatus 2002 configured to perform the functions recited by the aforementioned means. As described supra, the apparatus 2002 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a first wireless device, comprising: establishing a first connection with a second wireless device; transmitting a first credential to the second wireless device in order to establish a second connection with a network entity, the first credential associated with relay of wireless traffic between the first wireless device and a network entity; and establishing a second connection with the network entity via the second wireless device based on a second credential.

Aspect 2 is the method of aspect 1, wherein the first connection is a non-Uu connection, and the second connection is a Uu connection.

Aspect 3 is the method of any of aspects 1-2, wherein the non-Uu connection is a sidelink connection, a BLE connection, a WiFi-D connection, a WiFi connection, or a Bluetooth regular connection.

Aspect 4 is the method of any of aspects 1-3, wherein the first credential is limited to the relay of the second connection for the first wireless device.

Aspect 5 is the method of any of aspects 1-4, wherein the first credential is generated based on the second credential with access authorization based on relay operation.

Aspect 6 is the method of any of aspects 1-5, wherein the first credential and the second credential are associated with a same user identifier.

Aspect 7 is the method of any of aspects 1-6, wherein the first wireless device is a UE and the second wireless device is associated with a vehicle.

Aspect 8 is the method of any of aspects 1-7, wherein the first wireless device is a first UE and the second wireless device is a second UE.

Aspect 9 is the method of any of aspects 1-8, wherein establishing the first connection, is based at least in part on: determining a link failure with the network entity via a first RAT interface; and discovering the second wireless device based on a discovery procedure for a second RAT.

Aspect 10 is the method of any of aspects 1-9, wherein discovering the second wireless device further comprises: receiving an indication that the second wireless device supports relaying to the network entity over the first RAT.

Aspect 11 is the method of any of aspects 1-10, wherein establishing the second connection with the network entity, further comprises: establishing a context with the network entity via the second wireless device; and establishing a PDU session with the network entity for a first RAT via the second wireless device.

Aspect 12 is the method of any of aspects 1-11, further comprising: receiving at least one message for RRC setup, RRC resume, or RRC reestablishment from the network entity via the second wireless device on a first SRB corresponding to the first RAT of the network entity; and receiving RRC messages on a second SRB corresponding to the first RAT after establishing a security context with the network entity.

Aspect 13 is the method of any of aspects 1-12, further comprising: receiving, from the network entity via the second wireless device, a configuration of the second SRB and a DRB for exchanging the wireless traffic with the network entity.

Aspect 14 is a method of wireless communication including relay of wireless traffic for a first wireless device at a second wireless device, comprising: establishing a first connection with the first wireless device; receiving a credential from the first wireless device, the credential associated with the relay of the wireless traffic between the first wireless device and a network entity; and establishing a second connection with the network entity for the relay of wireless traffic between the first wireless device and a network entity, the second connection being established based on the credential received from the first wireless device.

Aspect 15 is the method of aspect 14, wherein the first connection is a non-Uu connection, and the second connection is a Uu connection.

Aspect 16 is the method of any of aspects 14-15, wherein the non-Uu connection is a sidelink connection, a BLE connection, a WiFi-D connection, a WiFi connection, or a Bluetooth regular connection.

Aspect 17 is the method of any of aspects 14-16, wherein the credential is limited to the relay of the wireless traffic for the first wireless device.

Aspect 18 is the method of any of aspects 14-17, wherein the first wireless device is a UE and the second wireless device is associated with a vehicle.

Aspect 19 is the method of any of aspects 14-18, wherein the first wireless device is a first UE and the second wireless device is a second UE.

Aspect 20 is the method of any of aspects 14-19, wherein the first connection is for a first RAT that is different than a second RAT for the second connection, the method further comprising: performing discovery with the first wireless device based on a discovery procedure for the first RAT.

Aspect 21 is the method of any of aspects 14-20, wherein performing the discovery with the second wireless device further comprises: transmitting an indication that the second wireless device supports relaying to the network entity with a connection for the second RAT controlled by the first wireless device.

Aspect 22 is the method of any of aspects 14-21, further comprising: relaying for multiple UEs using a dedicated first RAT RLC channel corresponding with each UE.

Aspect 23 is the method of any of aspects 14-22, further comprising: relaying the wireless traffic between the network entity and the first wireless device without an adaptation function.

Aspect 24 is the method of any of aspects 14-23, further comprising: receiving the wireless traffic from the network entity over a first RAT SRB or DRB configured by the network entity for the first wireless device; and relaying the wireless traffic to the first wireless device over the first connection.

Aspect 25 is the method of any of aspects 14-24, further comprising: receiving a configuration from the network entity for a relaying radio link channel and a first quality of service for the second connection based on the first RAT DRB for the first wireless device; and managing, by the second wireless device, a second quality of service and a context for the first connection with the first wireless device based on a second RAT.

Aspect 26 is a method of wireless communication at a network entity, comprising: establishing, based on a first credential for a first wireless device, a first connection with a second wireless device for relaying of wireless traffic between the first wireless device and the network entity; and establishing a second connection with the first wireless device via the second wireless device based on a second credential.

Aspect 27 is the method of aspect 26, wherein the first credential is limited to the relay of the wireless traffic for the first wireless device.

Aspect 28 is the method of any of aspects 26-27, wherein the first wireless device is a UE and the second wireless device is associated with a vehicle.

Aspect 29 is the method of any of aspects 26-28, wherein the first wireless device is a first UE and the second wireless device is a second UE.

Aspect 30 is the method of any of aspects 26-29, wherein establishing the second connection to the second wireless device includes: establishing a security context with the first wireless device; and establishing a PDU session with the first wireless device.

Aspect 31 is an apparatus for wireless communication including at least one processor coupled to a memory and configured to implement a method as in any of aspects 1 to 13.

Aspect 32 is an apparatus for wireless communication including at least one processor coupled to a memory and configured to implement a method as in any of aspects 14 to 25.

Aspect 33 is an apparatus for wireless communication including at least one processor coupled to a memory and configured to implement a method as in any of aspects 26 to 30.

Aspect 34 is an apparatus for wireless communication including means for implementing a method as in any of aspects 1 to 13.

Aspect 35 is an apparatus for wireless communication including means for implementing a method as in any of aspects 14 to 25.

Aspect 36 is an apparatus for wireless communication including means for implementing a method as in any of aspects 26 to 30.

Aspect 37 is a computer-readable medium storing computer executable code, where the code when executed by a processor causes the processor to implement a method as in any of aspects 1 to 13.

Aspect 38 is a computer-readable medium storing computer executable code, where the code when executed by a processor causes the processor to implement a method as in any of aspects 14 to 25.

Aspect 39 is a computer-readable medium storing computer executable code, where the code when executed by a processor causes the processor to implement a method as in any of aspects 26 to 30.

What is claimed is:

1. A method of wireless communication at a first wireless device, comprising:
   establishing a first connection with a second wireless device;
   transmitting a first credential to the second wireless device in order to establish a second connection with a network entity, the first credential associated with relay of wireless traffic between the first wireless device and the network entity; and
   establishing a third connection with the network entity, the third connection being via the second wireless device and based on a second credential.

2. The method of claim 1, wherein the first connection is a non-Uu connection, and the second connection and the third connection are each Uu connections.

3. The method of claim 2, wherein the non-Uu connection includes one of a sidelink connection, a Bluetooth low energy (BLE) connection, a WiFi-D connection, a WiFi connection, or a Bluetooth (BL) regular connection.

4. The method of claim 1, wherein the first credential is associated with the relay of the wireless traffic for the first wireless device.

5. The method of claim 1, wherein the first credential is generated based on the second credential and the first credential is associated with an access authorization based on a relay operation.

6. The method of claim 1, wherein the first credential and the second credential are associated with a same user identifier.

7. The method of claim 1, wherein the first wireless device is a user equipment (UE) and the second wireless device is associated with a vehicle.

8. The method of claim 1, wherein the first wireless device is a first user equipment (UE) and the second wireless device is a second UE.

9. The method of claim 1, wherein establishing the first connection is based at least in part on:
   determining a link failure with the network entity via a first radio access technology (RAT) interface; and
   discovering the second wireless device based on a discovery procedure for a second RAT.

10. The method of claim 9, wherein discovering the second wireless device further comprises:
    receiving an indication that the second wireless device supports relaying to the network entity over the first RAT interface.

11. The method of claim 1, wherein establishing the third connection with the network entity, further comprises:
    establishing a context with the network entity via the second wireless device; and
    establishing a protocol data unit (PDU) session with the network entity for a first radio access technology (RAT) via the second wireless device.

12. The method of claim 1, further comprising:
    receiving at least one message for one of radio resource control (RRC) setup, RRC resume, or RRC reestablishment from the network entity via the second wireless device on a first signaling radio bearer (SRB) corresponding to a first radio access technology (RAT) of the network entity; and
    receiving one or more RRC messages on a second SRB corresponding to the first RAT after establishing a security context with the network entity.

13. The method of claim 12, further comprising:
    receiving, from the network entity via the second wireless device, a configuration of the second SRB and a data radio bearer (DRB) for exchanging the wireless traffic with the network entity.

14. The method of claim 1, further comprising:
    transmitting the first credential to a third wireless device;
    reestablishing a security context and a protocol data unit (PDU) session with the network entity via the third wireless device; and
    selecting a target path based on a reselection procedure for a radio access technology (RAT) for the third connection.

15. The method of claim 14, further comprising:
    receiving, from the network entity, an indication to connect to the third wireless device to relay the wireless traffic to the network entity, wherein selecting the target path is based on the indication from the network entity.

16. The method of claim 15, further comprising:
    transmitting a measurement to the network entity via the second wireless device, the indication to connect to the third wireless device being based on the measurement.

17. The method of claim 14, further comprising:
    reestablishing the security context and the PDU session with the network entity via the third wireless device.

18. The method of claim 1, further comprising:
    receiving an indication to release the first connection due to radio link failure from the second wireless device for a link between the second wireless device and the network entity.

19. A method of wireless communication including relay of wireless traffic for a first wireless device at a second wireless device, comprising:
    establishing a first connection with the first wireless device;
    receiving a first credential from the first wireless device, the first credential associated with the relay of the wireless traffic between the first wireless device and a network entity;
    establishing a second connection with the network entity for the relay of the wireless traffic between the first wireless device and the network entity, the second connection being established based on the first credential received from the first wireless device; and receiving a second credential from the first wireless device, the second credential associated with a third connection between the first wireless device and the network entity, the third connection being via the second wireless device.

20. The method of claim 19, wherein the first connection is a non-Uu connection, and the second connection and the third connection are each Uu connections.

21. The method of claim 20, wherein the non-Uu connection includes one of a sidelink connection, a Bluetooth low energy (BLE) connection, a WiFi-D connection, a WiFi connection, or a Bluetooth (BL) regular connection.

22. The method of claim 19, wherein the first credential is associated with the relay of the wireless traffic for the first wireless device.

23. The method of claim 19, wherein the first wireless device is a user equipment (UE) and the second wireless device is associated with a vehicle.

24. The method of claim 19, wherein the first wireless device is a first user equipment (UE) and the second wireless device is a second UE.

25. The method of claim 19, wherein the first connection is for a first radio access technology (RAT) that is different than a second RAT for the second connection and the third connection, the method further comprising:
performing discovery with the first wireless device based on a discovery procedure for the first RAT.

26. The method of claim 25, wherein performing the discovery with the first wireless device further comprises:
transmitting an indication that the second wireless device supports relaying to the network entity.

27. The method of claim 19, further comprising:
relaying for multiple user equipment (UEs) using a dedicated first radio access technology (RAT) radio link control (RLC) channel corresponding with each UE.

28. The method of claim 19, further comprising:
relaying the wireless traffic between the network entity and the first wireless device without an adaptation function.

29. The method of claim 28, wherein the second wireless device relays the wireless traffic based on a mapping between a first radio access technology (RAT) link with the network entity for relaying to the first wireless device and a second RAT link with the first wireless device.

30. The method of claim 19, further comprising:
receiving the wireless traffic from the network entity over a first radio access technology (RAT) signaling radio bearer (SRB) or a first RAT data radio bearer (DRB); and
relaying the wireless traffic to the first wireless device over the first connection.

31. The method of claim 30, further comprising:
receiving a configuration from the network entity for a relaying radio link channel and a first quality of service (QoS) for the second connection based on the first RAT DRB for the first wireless device; and
managing, by the second wireless device, a second QoS and a context for the first connection with the first wireless device based on a second RAT.

32. The method of claim 30, wherein the second wireless device receives a configuration for a first RAT radio link control (RLC) channel for the first RAT SRB for the first wireless device and a second RAT RLC channel for the first RAT DRB for the first wireless device.

33. The method of claim 19, further comprising:
detecting a radio link failure for the second connection with the network entity; and
at least one of releasing or suspending the first connection with the first wireless device in response to detecting the radio link failure for the second connection.

34. The method of claim 19, further comprising:
detecting a radio link failure for the second connection with the network entity; and
stopping discovery advertisement for a radio access technology (RAT) of the first connection with the first wireless device in response to detecting the radio link failure for the second connection.

35. The method of claim 19, further comprising:
detecting a radio link failure for the first connection with the first wireless device; and
informing the network entity of the radio link failure for the first connection.

36. A method of wireless communication at a network entity, comprising:
establishing, based on a first credential for a first wireless device, a first connection with a second wireless device for relaying of wireless traffic between the first wireless device and the network entity; and
establishing a second connection with the first wireless device, the second connection being via the second wireless device and based on a second credential.

37. The method of claim 36, wherein the first credential is associated with relay of the wireless traffic for the first wireless device.

38. The method of claim 36, wherein the first wireless device is a user equipment (UE) and the second wireless device is associated with a vehicle.

39. The method of claim 36, wherein the first wireless device is a first user equipment (UE) and the second wireless device is a second UE.

40. The method of claim 36, wherein establishing the second connection to the second wireless device includes:
establishing a security context with the first wireless device; and
establishing a protocol data unit (PDU) session with the first wireless device.

41. The method of claim 36, the method further comprising:
configuring multiple radio link control (RLC) channels for the second wireless device to relay to multiple user equipment (UEs), the multiple RLC channels including a respective RLC channel for each of the multiple UEs.

42. The method of claim 36, further comprising:
configuring a quality of service (QoS) for the first connection with the second wireless device.

43. The method of claim 36, further comprising:
transmitting, on a first signaling radio bearer (SRB) of the network entity, at least one initial message for one of radio resource control (RRC) setup, RRC resume, or RRC reestablishment to the first wireless device via the second wireless device;
transmitting at least one RRC message on a second SRB after establishing a security context with the first wireless device; and
transmitting, to the first wireless device via the second wireless device, a configuration of the second SRB and a data radio bearer (DRB) for exchanging traffic with the network entity.

44. An apparatus for wireless communication at a first wireless device, comprising:
memory; and
at least one processor coupled to the memory, the at least one processor configured to cause the first wireless device to:

establish a first connection with a second wireless device;

transmit a first credential to the second wireless device in order to establish a second connection with a network entity, the first credential associated with relay of wireless traffic between the first wireless device and the network entity; and establish a third connection with the network entity, the third connection via the second wireless device and based on a second credential.

45. The apparatus of claim 44, wherein the first credential is generated based on the second credential and the first credential is associated with an access authorization based on a relay operation.

46. The apparatus of claim 44, wherein to establish the third connection with the network entity, the at least one processor is further configured to cause the first wireless device to:

establish a context with the network entity via the second wireless device; and establish a protocol data unit (PDU) session with the network entity for a first radio access technology (RAT) via the second wireless device.

47. The apparatus of claim 31, further comprising:

at least one antenna coupled to the at least one processor, wherein the at least one processor is further configured to cause the first wireless device to:

receive at least one message for one of radio resource control (RRC) setup, RRC resume, or RRC reestablishment from the network entity via the second wireless device on a first signaling radio bearer (SRB) corresponding to a first radio access technology (RAT) of the network entity; and receive one or more RRC messages on a second SRB corresponding to the first RAT after establishment of a security context with the network entity.

48. The apparatus of claim 47, wherein the at least one processor is further configured to cause the first wireless device to:

receive, from the network entity via the second wireless device, a configuration of the second SRB and a data radio bearer (DRB) configured to exchange the wireless traffic with the network entity.

49. The apparatus of claim 44, wherein the at least one processor is further configured to cause the first wireless device to:

transmit the first credential to a third wireless device;

reestablish a security context and a protocol data unit (PDU) session with the network entity via the third wireless device; and select a target path based on a reselection procedure for a radio access technology (RAT) for the third connection.

50. The apparatus of claim 49, wherein the at least one processor is further configured to cause the first wireless device to:

receive, from the network entity, an indication to connect to the third wireless device to relay the wireless traffic to the network entity, wherein selection of the target path is based on the indication from the network entity; and transmit a measurement to the network entity via the second wireless device, the indication to connect to the third wireless device being based on the measurement.

51. The apparatus of claim 49, wherein the at least one processor is further configured to cause the first wireless device to:

reestablish the security context and the PDU session with the network entity via the third wireless device.

52. The apparatus of claim 44, wherein the at least one processor is further configured to cause the first wireless device to:

receive an indication to release the first connection due to radio link failure from the second wireless device for a link between the second wireless device and the network entity.

53. The apparatus of claim 44, wherein the at least one processor is individually or collectively configured to establish the first connection with the second wireless device, transmit the first credential to the second wireless device, establish the third connection with the network entity, transmit the first credential to the second wireless device, and establish the third connection with the network entity.

54. A non-transitory computer-readable storage medium comprising computer-executable code at a first wireless device, the computer-executable code, when executed, causes at least one processor of the first wireless device to:

establish a first connection with a second wireless device;

transmit a first credential to the second wireless device in order to establish a second connection with a network entity, the first credential associated with relay of wireless traffic between the first wireless device and the network entity; and establish a third connection with the network entity, the third connection being via the second wireless device and based on a second credential.

55. The non-transitory computer-readable storage medium of claim 54, wherein the first credential is generated based on the second credential and the first credential is associated with an access authorization based on a relay operation.

56. The non-transitory computer-readable storage medium of claim 36, wherein to establish the third connection with the network entity, the computer-executable code, when executed, causes the at least one processor of the first wireless device to:

establish a context with the network entity via the second wireless device; and establish a protocol data unit (PDU) session with the network entity for a first radio access technology (RAT) via the second wireless device.

57. The non-transitory computer-readable storage medium of claim 54, wherein the computer-executable code, when executed, causes the at least one processor of the first wireless device to:

receive at least one message for one of radio resource control (RRC) setup, RRC resume, or RRC reestablishment from the network entity via the second wireless device on a first signaling radio bearer (SRB) corresponding to a first radio access technology (RAT) of the network entity; and receive one or more RRC messages on a second SRB corresponding to the first RAT after establishment of a security context with the network entity.

58. The non-transitory computer-readable storage medium of claim 57, wherein the computer-executable code, when executed, causes the at least one processor of the first wireless device to:

receive, from the network entity via the second wireless device, a configuration of the second SRB and a data radio bearer (DRB) configured to exchange the wireless traffic with the network entity.

59. An apparatus for wireless communication including relay of wireless traffic for a first wireless device at a second wireless device, comprising:
  memory; and
  at least one processor coupled to the memory, the at least one processor configured to cause the second wireless device to:
    establish a first connection with the first wireless device;
    receive a first credential from the first wireless device, the first credential associated with the relay of the wireless traffic between the first wireless device and a network entity;
    establish a second connection with the network entity for the relay of the wireless traffic between the first wireless device and the network entity, the second connection established based on the first credential received from the first wireless device; and
    receive a second credential from the first wireless device, the second credential associated with a third connection between the first wireless device and the network entity, the third connection via the second wireless device.

60. The apparatus of claim 59, further comprising:
  at least one antenna coupled to the at least one processor, wherein the at least one processor is further configured to cause the second wireless device to:
  receive the wireless traffic from the network entity over a first radio access technology (RAT) signaling radio bearer (SRB) or a first RAT data radio bearer (DRB); and
  relay the wireless traffic to the first wireless device over the first connection.

61. The apparatus of claim 60, wherein the at least one processor is further configured to cause the second wireless device to:
  receive a configuration from the network entity for a relaying radio link channel and a first quality of service (QoS) for the second connection based on the first RAT DRB for the first wireless device; and
  manage, by the second wireless device, a second QoS and a context for the first connection with the first wireless device based on a second RAT.

62. The apparatus of claim 60, wherein the at least one processor is further configured to cause the second wireless device to:
  receive a configuration for a first RAT radio link control (RLC) channel for the first RAT SRB for the first wireless device and a second RAT RLC channel for the first RAT DRB for the first wireless device.

63. The apparatus of claim 59, wherein the at least one processor is further configured to cause the second wireless device to:
  detect a radio link failure for the second connection with the network entity; and
  at least one of release or suspend the first connection with the first wireless device in response to detecting the radio link failure for the second connection.

64. The apparatus of claim 59, wherein the at least one processor is further configured to cause the second wireless device to:
  detect a radio link failure for the second connection with the network entity; and
  stop discovery advertisement for a radio access technology (RAT) of the first connection with the first wireless device in response to detecting the radio link failure for the second connection.

65. The apparatus of claim 59, wherein the at least one processor is further configured to cause the second wireless device to:
  detect a radio link failure for the first connection with the first wireless device; and
  inform the network entity of the radio link failure for the first connection.

66. The apparatus of claim 59, wherein the at least one processor is individually or collectively configured to establish the first connection with the first wireless device, receive the first credential from the first wireless device, establish the second connection with the network entity, and receive the second credential from the first wireless device.

67. A non-transitory computer-readable storage medium comprising computer-executable code for relay of wireless traffic for a first wireless device at a second wireless device, the computer-executable code, when executed, causes atleast one processor of the second wireless device to:
  establish a first connection with the first wireless device;
  receive a first credential from the first wireless device, the first credential associated with the relay of the wireless traffic between the first wireless device and a network entity;
  establish a second connection with the network entity for the relay of the wireless traffic between the first wireless device and the network entity, the second connection being established based on the first credential received from the first wireless device; and
  receive a second credential from the first wireless device, the second credential associated with a third connection between the first wireless device and the network entity, the third connection being via the second wireless device.

68. The non-transitory computer-readable storage medium of claim 67, wherein the computer-executable code, when executed, causes the at least one processor of the second wireless device to:
  receive the wireless traffic from the network entity over a first radio access technology (RAT) signaling radio bearer (SRB) or a first RAT data radio bearer (DRB); and
  relay the wireless traffic to the first wireless device over the first connection.

69. The non-transitory computer-readable storage medium of claim 68, wherein the computer-executable code, when executed, causes the at least one processor of the second wireless device to:
  receive a configuration from the network entity for a relaying radio link channel and a first quality of service (QoS) for the second connection based on the first RAT DRB for the first wireless device; and
  manage, by the second wireless device, a second QoS and a context for the first connection with the first wireless device based on a second RAT.

70. An apparatus for wireless communication at a network entity, comprising:
  memory; and
  at least one processor coupled to the memory, the at least one processor configured to cause the network entity to:
    establish, based on a first credential for a first wireless device, a first connection with a second wireless device for relay of wireless traffic between the first wireless device and the network entity; and
    establish a second connection with the first wireless device, the second connection being via the second wireless device and based on a second credential.

71. The apparatus of claim 70, further comprising:
at least one antenna coupled to the at least one processor, wherein to establish the second connection to the second wireless device, the at least one processor is further configured to cause the network entity to:
establish a security context with the first wireless device; and
establish a protocol data unit (PDU) session with the first wireless device.

72. The apparatus of claim 70, wherein the at least one processor is further configured to cause the network entity to:
configure multiple radio link control (RLC) channels for the second wireless device to relay to multiple user equipment (UEs), the multiple RLC channels including a respective RLC channel for each of the multiple UEs.

73. The apparatus of claim 70, wherein the at least one processor is further configured to cause the network entity to:
configure a quality of service (QoS) for the first connection with the second wireless device.

74. The apparatus of claim 70, wherein the at least one processor is further configured to cause the network entity to:
transmit, on a first signaling radio bearer (SRB) of the network entity, at least one initial message for one of radio resource control (RRC) setup, RRC resume, or RRC reestablishment to the first wireless device via the second wireless device;
transmit at least one RRC message on a second SRB after a security context with the first wireless device is established; and
transmit, to the first wireless device via the second wireless device, a configuration of the second SRB and a data radio bearer (DRB) for exchanging traffic with the network entity.

75. The apparatus of claim 70, wherein the at least one processor is individually or collectively configured to establish the first connection with the second wireless device for the relay of the wireless traffic between the first wireless device and the network entity, and establish the second connection with the first wireless device, the second connection being via the second wireless device and based on the second credential.

76. A non-transitory computer-readable storage medium comprising computer-executable code at a network entity, the computer-executable code, when executed, causes at least one processor of the network entity to:
establish, based on a first credential for a first wireless device, a first connection with a second wireless device for relay of wireless traffic between the first wireless device and the network entity; and
establish a second connection with the first wireless device, the second connection being via the second wireless device and based on a second credential.

77. The non-transitory computer-readable storage medium of claim 49, wherein to establish the second connection to the second wireless device, the computer-executable code, when executed, causes the at least one processor of the network entity to:
establish a security context with the first wireless device; and
establish a protocol data unit (PDU) session with the first wireless device.

* * * * *